(12) United States Patent  (10) Patent No.: US 8,668,254 B2
Onodera et al.  (45) Date of Patent: Mar. 11, 2014

(54) VEHICLE UNDERFLOOR STRUCTURE

(75) Inventors: Takeshi Onodera, Kawasaki (JP);
 Yasutsune Terashima, Ebina (JP)

(73) Assignee: Nissan Motor Co., Ltd., Yokohama-shi (JP)

(*) Notice: Subject to any disclaimer, the term of this patent is extended or adjusted under 35 U.S.C. 154(b) by 0 days.

(21) Appl. No.: 13/639,250

(22) PCT Filed: Apr. 7, 2011

(86) PCT No.: PCT/JP2011/058840
 § 371 (c)(1),
 (2), (4) Date: Oct. 4, 2012

(87) PCT Pub. No.: WO2011/126086
 PCT Pub. Date: Oct. 13, 2011

(65) Prior Publication Data
 US 2013/0026797 A1    Jan. 31, 2013

(30) Foreign Application Priority Data
 Apr. 8, 2010 (JP) ................................. 2010-089340
 Apr. 14, 2010 (JP) ................................. 2010-092797

(51) Int. Cl.
 *B62D 35/02* (2006.01)
(52) U.S. Cl.
 USPC ............. 296/204; 296/208; 296/38; 180/69.1
(58) Field of Classification Search
 USPC ............. 296/180.1, 38, 193.07–193.09, 208, 296/204; 180/69.1
 See application file for complete search history.

(56) References Cited

U.S. PATENT DOCUMENTS

| 6,435,298 B1 | 8/2002 | Mizuno et al. |
| 7,815,250 B2 | 10/2010 | Oshio et al. |
| 2011/0095562 A1 | 4/2011 | Yamagishi et al. |

FOREIGN PATENT DOCUMENTS

| DE | 10 2006 013 554 A1 | 10/2007 |
| DE | 10 2006 046 814 A1 | 4/2008 |
| JP | 60-157350 U | 10/1985 |
| JP | 61-190781 U | 11/1986 |
| JP | 1-80581 U | 5/1989 |
| JP | 8-91251 A | 4/1996 |
| JP | 9-193839 A | 7/1997 |
| JP | 2000-185672 A | 7/2000 |
| JP | 2001-18852 A | 1/2001 |
| JP | 2007-283912 A | 11/2007 |
| JP | 2009-90681 A | 4/2009 |
| JP | 2009-96438 A | 5/2009 |
| JP | 2010-58639 A | 3/2010 |
| JP | 2010-76485 A | 4/2010 |

*Primary Examiner* — Dennis Pedder
(74) *Attorney, Agent, or Firm* — Foley & Lardner LLP

(57) ABSTRACT

A vehicle underfloor structure includes under covers (3, 4, 5, 6, 7) that cover an underside of a vehicle, and drain members (D) provided in the under covers (3, 4, 5, 6, 7). The drain members (D) each include: a front inclined wall (21) provided with a water drain opening (33, 34, 42, 43, 44, 72, 74); and a rear inclined wall (22). A recess is formed in each under cover in a front-back direction of the vehicle in such a manner that a first interior angle (θ1) formed by the front inclined wall is larger than a second interior angle (θ2) formed by the rear inclined wall and a length of the front inclined wall is different from a length of the rear inclined wall.

15 Claims, 15 Drawing Sheets

CLASSIFICATION OF RESISTANCE GENERATION FACTORS

VEHICLE UNDERFLOOR STRUCTURE

TECHNICAL FIELD

The present invention relates to a vehicle underfloor structure in which an underside surface of a vehicle is covered with an under cover provided with a drain member.

BACKGROUND ART

Patent Document 1 discloses a vehicle underfloor structure in which an underside surface is covered with an under cover provided with a drain member. In such an underfloor structure, the underside surface is provided with recesses projecting inward, and water drain holes partly overlapped with peripheral portions on the front side of the recesses.

In the conventional underfloor structure, the water drain holes are formed into an elliptical shape elongated in a front-back direction of the vehicle, and the recesses are partly overlapped with the elliptical holes. Thus, air flowing along a bottom surface of the under cover is hardly introduced into the under cover. In other words, Patent Document 1 aims at providing the under cover including the water drain holes that hardly let water penetrate inside of the under cover.

CITATION LIST

Patent Literature

Patent Document 1: Japanese Patent Unexamined Publication No. 2001-018852

SUMMARY OF INVENTION

The conventional underfloor structure can prevent an increase in air resistance due to the water drain holes formed into an elliptical shape elongated in the front-back direction of the vehicle (refer to FIG. 4 of Patent Document 1). However, if a large amount of water and mud water penetrates inside of the under cover, the water and mud water tend to be stored in the under cover because the opening areas of the water drain holes are small and do not have a sufficient drainage capacity.

Further, in the conventional underfloor structure, a large part of the opening of each water drain hole is exposed on the cover surface of the under cover formed in a traveling airflow direction (refer to FIG. 5 of Patent Document 1). Therefore, if the opening areas of the water drain holes are increased to improve the drainage capacity, the traveling airflow is easily introduced through the water drain holes because the exposed opening areas on the cover surface are also increased. As a result, a turbulent flow around the water drain holes is caused and air resistance is increased.

The present invention has been made in view of the above-described conventional problems. It is an object of the present invention to provide a vehicle underfloor structure in which an increase in air resistance is suppressed during driving while a drainage capacity in an under cover is ensured so that an aerodynamic property of the entire vehicle can be improved.

A vehicle underfloor structure of the present invention includes an under cover that covers an underside of a vehicle; and a drain member provided in the under cover. The drain member (drain means) includes: a front inclined wall inclined upward toward a back of the vehicle from a front wall end portion extending in a vehicle width direction in the under cover, and provided with a water drain opening penetrating at least part of the front inclined wall; and a rear inclined wall inclined downward from a bent wall portion connected to the front inclined wall toward a rear wall end portion extending in the vehicle width direction in the under cover, and including a traveling airflow adjusting surface provided in a wall surface of the rear inclined wall to adjust a traveling airflow. In addition, a recess is formed in the under cover in a front-back direction of the vehicle in such a manner that a first interior angle formed by the front inclined wall is larger than a second interior angle formed by the rear inclined wall and a length of the front inclined wall is different from a length of the rear inclined wall.

DESCRIPTION OF EMBODIMENTS

Hereinafter, a preferred embodiment to achieve a vehicle underfloor structure of the present invention will be described below according to Examples 1 and 2.

EXAMPLE 1

Figure 1:
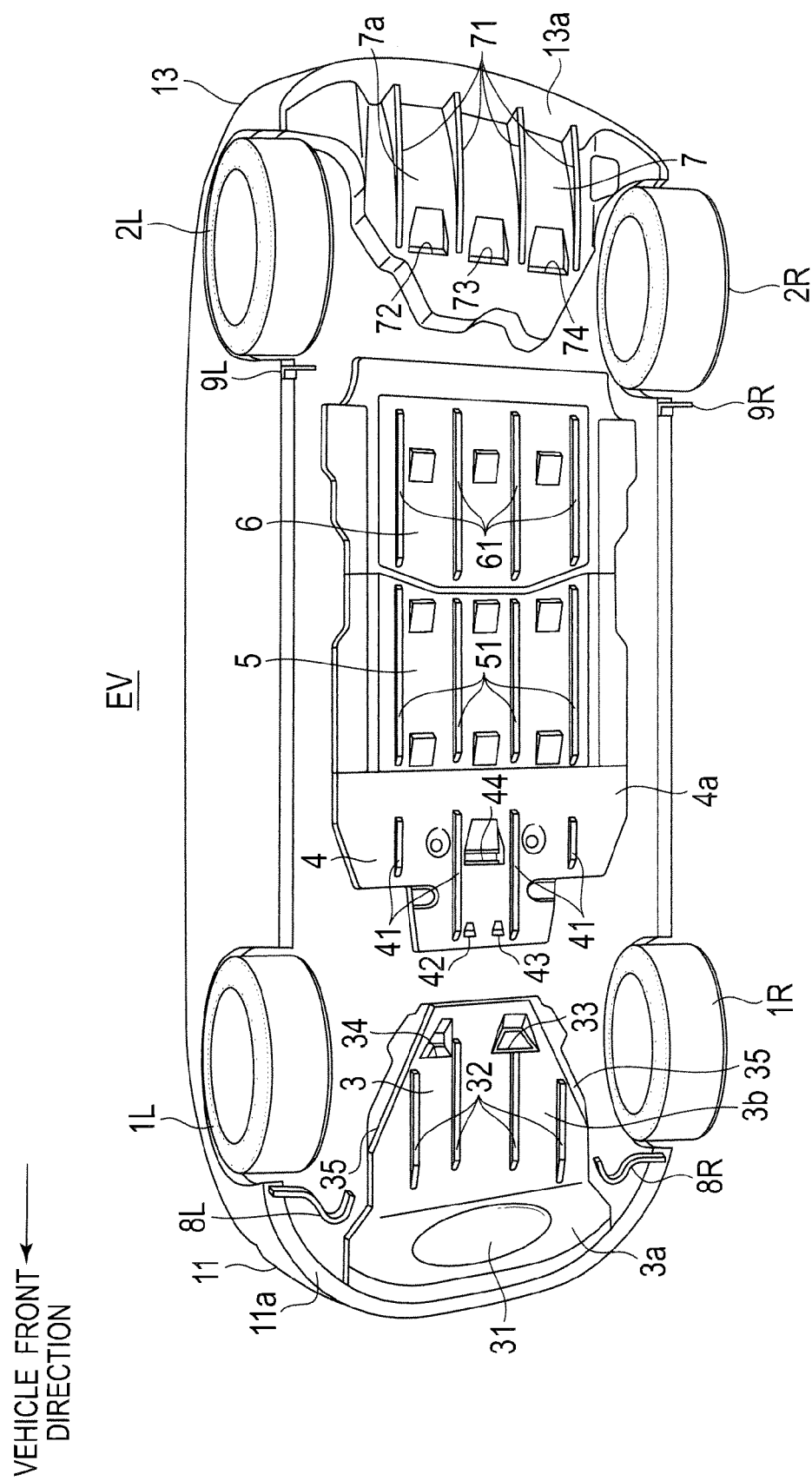
FIG. 1 is a perspective view showing an entire underfloor structure according to Example 1 applied to an electric vehicle.

FIG. 1 is a perspective view showing the entire underfloor structure according to Example 1 applied to an electric vehicle. As shown in FIG. 1, the entire underfloor structure of an electric vehicle EV of Example 1 includes a pair of front tires 1L and 1R, and a pair of rear tires 2L and 2R. The underfloor structure further includes a front under cover 3, a motor room rear under cover 4, a first battery under cover 5, a second battery under cover 6 and a rear under cover 7 (an example of under covers). Still further, the underfloor structure includes a pair of front deflectors 8L and 8R, and a pair of rear deflectors 9L and 9R.

The pair of front tires 1L and 1R are not only steering wheels but also driving wheels elastically fixed to a vehicle body via a front suspension link (not shown in the figure). The pair of rear tires 2L and 2R are elastically fixed to the vehicle body via a rear suspension (not shown in the figure) such as a trailing type suspension.

The front under cover 3 covers a front area of the vehicle from a flange 11a of a front bumper fascia 11 to a front suspension member 14. A cover surface of the front under cover 3 has a smoothly angled surface composed of an inclined portion 3a inclined downward toward the back of the vehicle and a flat portion 3b continuous with the inclined portion 3a. The inclined portion 3a is provided with a rounded projection 31 having a major axis in a vehicle width direction. The flat portion 3b is provided with four elongated projections 32 extending in a front-back direction of the vehicle, and two water drain openings 33 and 34. The front under cover 3 also includes inclined side portions 35 in which a width therebetween is gradually decreased toward the back side of the vehicle.

Figure 13:
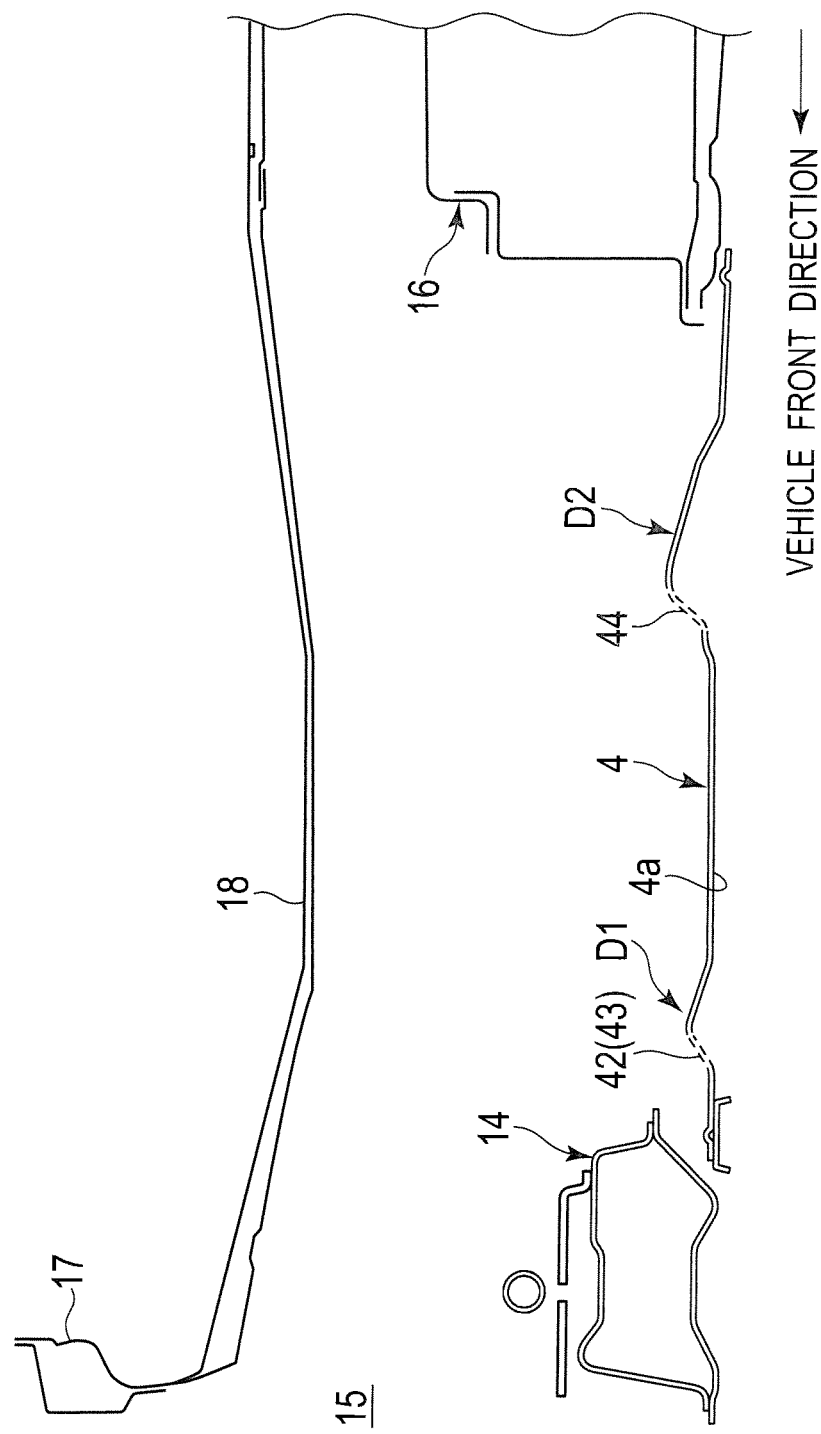
FIG. 13 is a cross-sectional view showing a vehicle body structure in an area provided with the motor room rear under cover.

The motor room rear under cover 4 covers a front portion in the center region from the front suspension member 14 to the back of the motor room 15 (refer to FIG. 13). A cover surface of the motor room rear under cover 4 is provided at approximately the same level as the flat portion 3b of the front under cover 3. The motor room rear under cover 4 is provided with four elongated projections 41 extending in the front-back direction of the vehicle, two water drain openings 42 and 43 on the front side having small opening areas, and a water drain opening 44 on the back side having a large opening area.

The first battery under cover 5 and the second battery under cover 6 are connected to each other to cover a back portion in the center region from the back of the motor room 15 to the back end of a battery unit 16. Each cover surface of the battery under covers 5 and 6 are provided at approximately the same level as the cover surface of the motor room rear under cover 4. The two battery under covers 5 and 6 are each provided with four elongated projections 51 and 61 extending in the front-back direction of the vehicle. The motor room rear under cover 4 and the two battery under covers 5 and 6 are connected together to compose a center under cover as a whole.

The rear under cover 7 covers a back area of the vehicle from a rear suspension member to a flange 13a of a rear bumper fascia 13. A cover surface 7a of the rear under cover 7 has a diffuser structure with an obliquely curved surface gently inclined upward from approximately the same level as the surface of the second battery under cover 6 toward the back side of the vehicle. The rear under cover 7 is provided with four airflow adjusting elongated projections 71 extending in the front-back direction of the vehicle and gradually increasing in height toward the back side of the vehicle, and three water drain openings 72, 73 and 74 each located between the respective airflow adjusting elongated projections 71 in an inlet area of the diffuser structure.

The pair of front deflectors 8L and 8R project downward in the front positions of the pair of front tires 1L and 1R to adjust a traveling airflow flowing around the pair of the front tires 1L and 1R during driving. The pair of rear deflectors 9L and 9R project downward in the front positions of the pair of rear tires 2L and 2R to adjust a traveling airflow flowing around the pair of rear tires 2L and 2R during driving.

Figure 2:
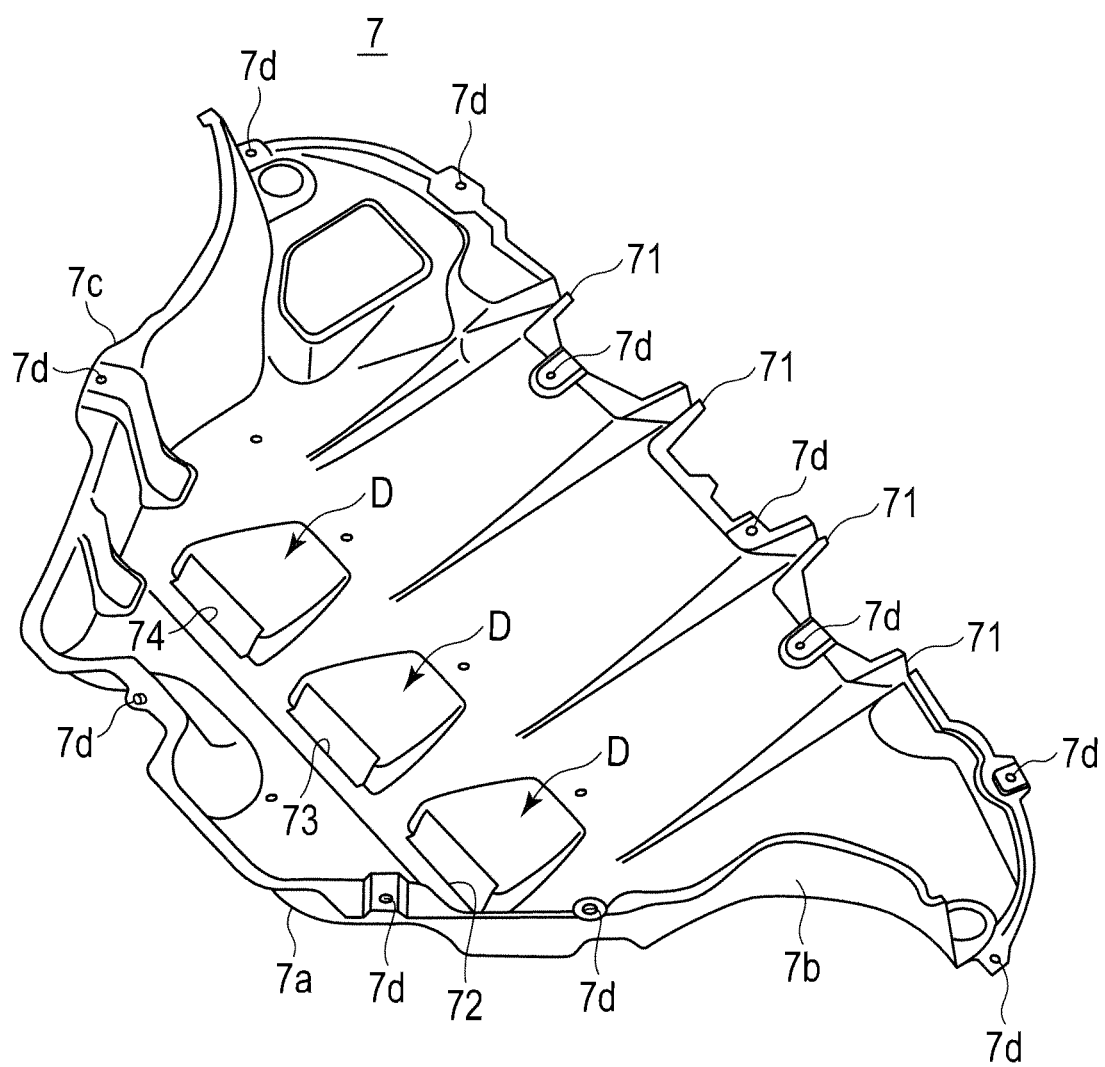
FIG. 2 is a perspective view showing a rear under cover of the underfloor structure according to Example 1 as viewed from an upper front direction of the vehicle.
Figure 3:
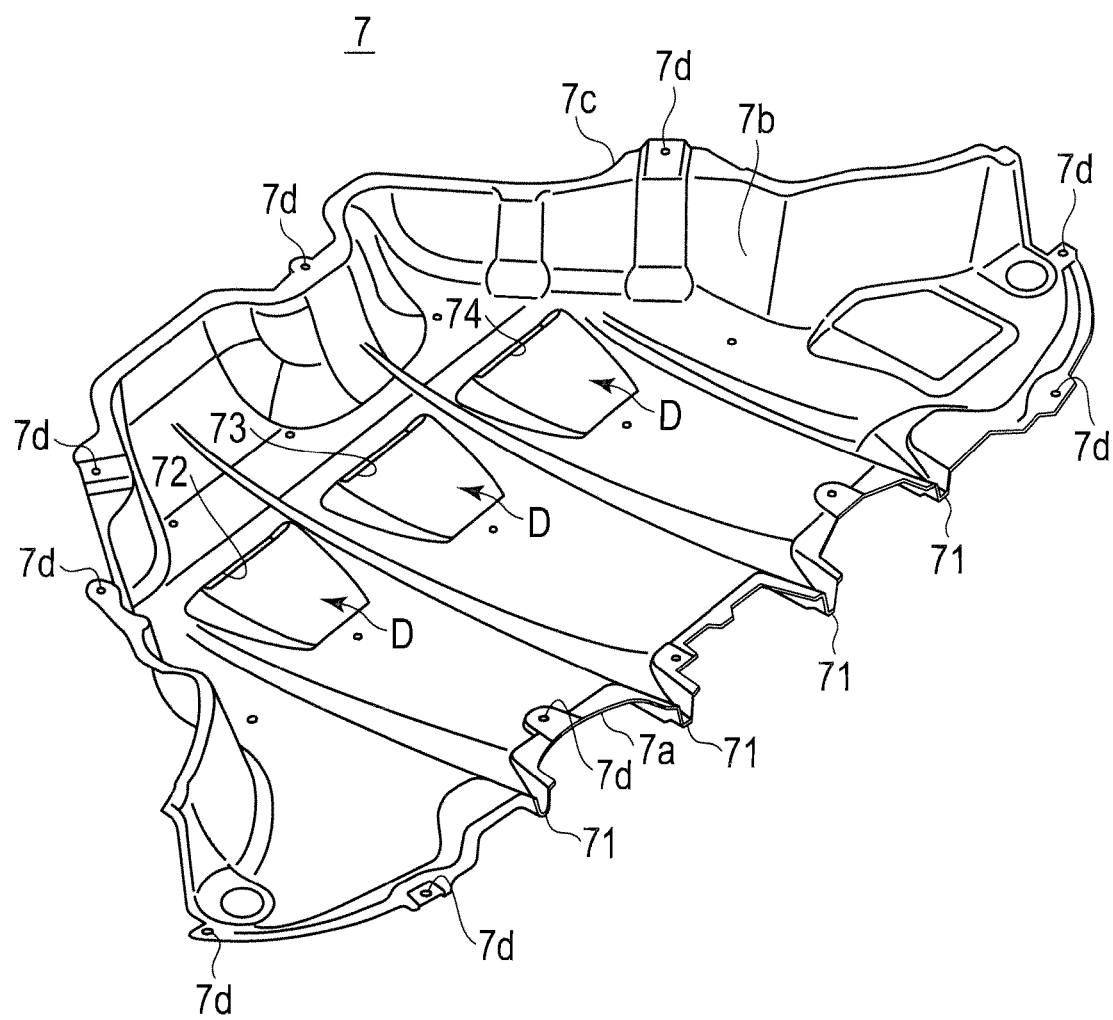
FIG. 3 is a perspective view showing the rear under cover as viewed from an upper back direction of the vehicle.

FIGS. 2 and 3 are perspective views each showing the rear under cover 7 in the underfloor structure according to Example 1. As shown in FIGS. 2 and 3, the rear under cover 7 of Example 1 is formed into a tray shape that covers the back area of the vehicle and stores water and mud water. The rear under cover 7 is made of synthetic resin integrally formed by press molding. The rear under cover 7 is provided with the four airflow adjusting elongated projections 71 extending in the front-back direction of the vehicle and gradually increasing in height toward the back side of the vehicle. The rear under cover 7 is also provided with three drain members D having the water drain openings 72, 73 and 74 each located between the respective airflow adjusting elongated projections 71 in the inlet area of the diffuser structure.

The rear under cover 7 is provided with a rising portion 7b on the periphery thereof excluding the back portion adjacent to the flange 13a of the rear bumper fascia 13. A flange 7c is formed along the rising portion 7b, and provided with openings for plural bolt holes 7d. Thus, the rear under cover 7 is fixed in the back region of the vehicle by bolts inserted into the bolt holes 7d and fastened tightly.

Figure 4:
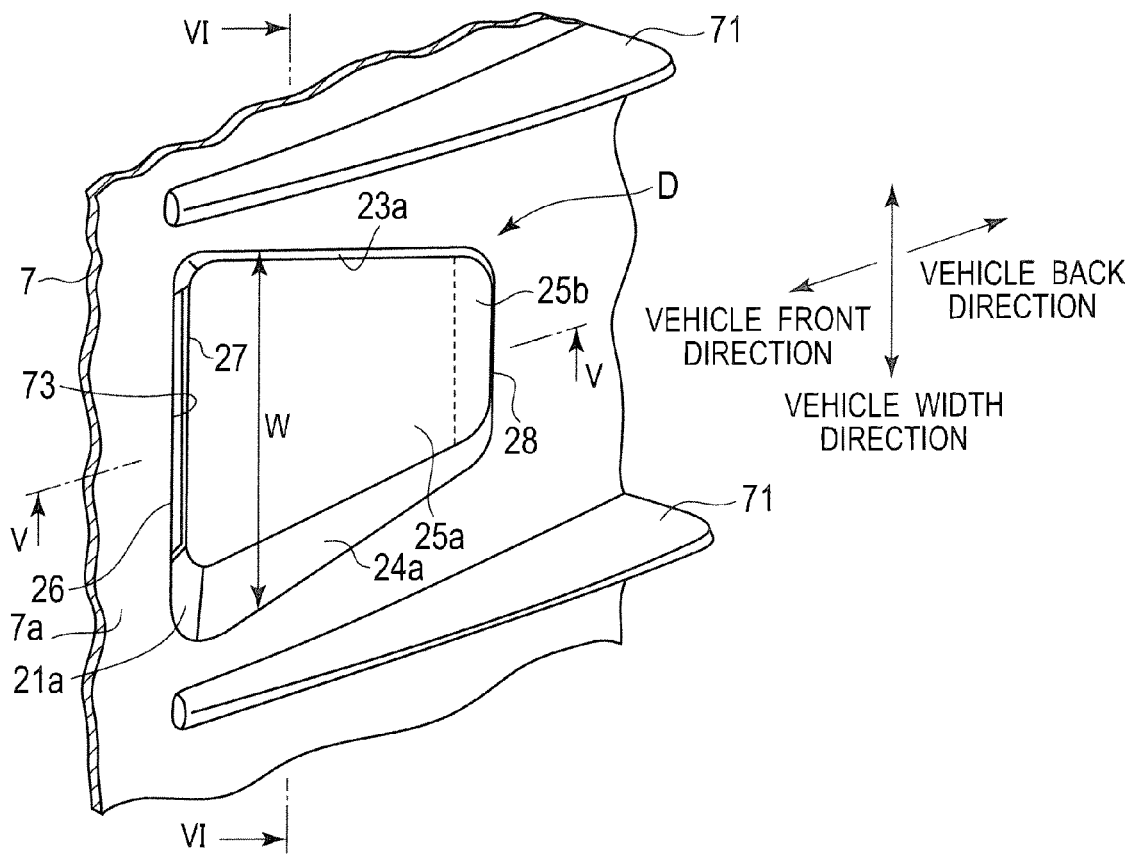
FIG. 4 is an enlarged perspective view showing a drain member provided in the rear under cover.
Figure 5:
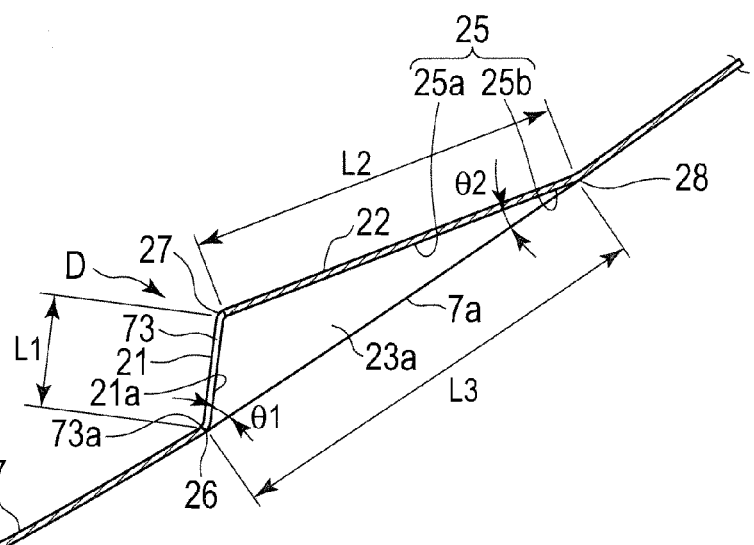
FIG. 5 is a cross-sectional view taken along the line V-V in FIG. 4.
Figure 6:
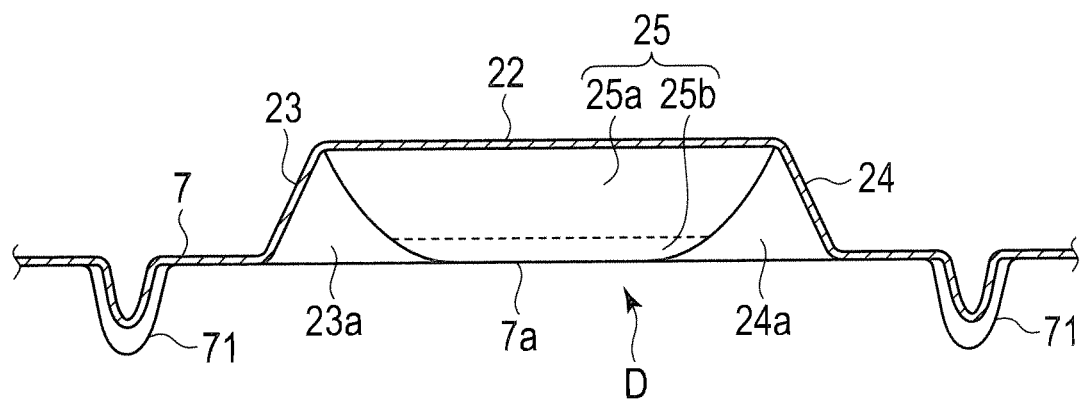
FIG. 6 is a cross-sectional view taken along the line VI-VI in FIG. 4.

FIGS. 4 to 6 are views showing the drain member D provided in the rear under cover 7 in the underfloor structure according to Example 1. Note that all of the water drain openings 33 and 34 formed in the front under cover 3, the water drain openings 42, 43 and 44 formed in the motor room rear under cover 4, and the water drain openings 72, 73 and 74 formed in the rear under cover 7 have the same structure. Hereinafter, the constitution of the drain member D provided with the water drain opening 73 in the rear under cover 7 will be explained as an example with reference to FIGS. 4 to 6.

As shown in FIGS. 4 to 6, the drain member D of Example 1 includes a front inclined wall 21, a rear inclined wall 22, a left wall 23, a right wall 24, the water drain opening 73 and a traveling airflow adjusting surface 25. In other words, the rear under cover 7 is provided with a recess surrounded by the front inclined wall 21, the rear inclined wall 22, the left wall 23 and the right wall 24. The water drain opening 73 is formed in the front inclined wall 21, and the traveling airflow adjusting surface 25 is formed in the rear inclined wall 22.

As shown in FIG. 5, the front inclined wall 21 is inclined upward toward the back side of the vehicle from a front wall end portion 26 extending in the vehicle width direction in the rear under cover 7. The water drain opening 73 penetrates at least part of the front inclined wall 21. The water drain opening 73 is formed into a rectangular shape approximately along the circumference of the front inclined wall 21. An opening front edge 73a of the water drain opening 73 is positioned in the area of the front wall end portion 26 from which the front inclined wall 21 is inclined upward.

As shown in FIG. 5, the rear inclined wall 22 is inclined downward from a bent wall portion 27 connected to the front inclined wall 21 toward a rear wall end portion 28 extending in the vehicle width direction in the rear under cover 7. The wall surface of the rear inclined wall 22 directly serves as the traveling airflow adjusting surface 25 to adjust a traveling airflow. The traveling airflow adjusting surface 25 includes a flat surface 25a extending from the bent wall portion 27 to the rear wall end portion 28, and a circular surface 25b formed into an approximately arc-like shape in cross-section. The circular surface 25b is smoothly connected to the cover surface 7a of the rear under cover 7 in the area of the rear wall end portion 28.

As shown in FIG. 6, the left wall 23 covers the left of a pair of triangle-shaped spaces facing each other in the vehicle width direction provided in such a manner that the front inclined wall 21 and the rear inclined wall 22 are inclined from the rear under cover 7 to form a recess. The right wall 24 covers the right of the pair of triangle-shaped spaces.

As shown in FIG. 4, a width W between two wall surfaces 23a and 24a of the left wall 23 and the right wall 24 facing each other in the vehicle width direction is gradually decreased from the front side to the back side of the vehicle.

A recessed shape in the rear under cover 7 in the front-back direction of the vehicle formed by the front inclined wall 21 and the rear inclined wall 22 will be explained. The recessed shape is formed by the wall surface 21a of the front inclined wall 21, the wall surface (the traveling airflow adjusting surface 25) of the rear inclined wall 22, and the cover surface 7a of the rear under cover 7. As shown in FIG. 5, the recess is formed approximately in a triangle in which two wall surface lengths L1 and L2 are different from each other. In other words, a first interior angle θ1 formed between the wall surface 21a of the front inclined wall 21 and the cover surface 7a of the rear under cover 7 is larger than a second interior angle θ2 formed between the traveling airflow adjusting surface 25 of the rear inclined wall 22 and the cover surface 7a of the rear under cover 7. Thus, when the wall surface length of the front inclined wall 21 is defined as L1, the wall surface length of the rear inclined wall 22 is defined as L2, and a recess length between the front wall end portion 26 and the rear wall end portion 28 is defined as L3, the relation of L1<L2<L3 is fulfilled. Namely, the wall surface length L1 of the front inclined wall 21 provided with the water drain opening 73 is shorter than the wall surface length L2 of the rear inclined wall 2 serving as the traveling airflow adjusting surface 25.

The first interior angle θ1 is configured to be larger than a flowing angle of a traveling airflow entering from the front wall end portion 26 of the rear under cover 7. Although the flowing angle of the traveling airflow depends on a flow rate of the traveling airflow, when the flowing angle is set at 30°, for example, the first interior angle θ1 is set to be larger than 30° (for example, between 45° and 90°).

The second interior angle θ2 is configured to be able to prevent a deflection of flow line of the traveling airflow passing along the traveling airflow adjusting surface 25 through the rear wall end portion 28 of the rear under cover 7. The angle to prevent the deflection of flow line of the traveling airflow is an angle to prevent the traveling airflow from causing separation, and the smaller angle is preferable. However, the second interior angle θ2 is required to have a longer recess length in the front-back direction of the vehicle as the angle θ2 is smaller. Therefore, the angle is set at, for example, 5° to 15° in view of a layout design.

Next, the functions of the underfloor structure according to Example 1 will be explained. First, an explanation "with regard to air resistance" will be made. Then, the functions of the underfloor structure of the electric vehicle EV according to Example 1 will be explained while dividing into the sections of "a function to improve an aerodynamic property by the entire underside/tires", "a water drain function and a traveling airflow adjusting function by the drain members", "a function of drainage capacity by the drain members" and "a function to suppress an increase in traveling resistance by the drain members".

[With Regard to Air Resistance]

Air resistance D (N) of the vehicle is defined by the following formula (1).

$$D = CD \times \tfrac{1}{2} \times \rho \times u^2 \times A \qquad (1)$$

Note that CD represents an air resistance coefficient (dimensionless), ρ represents an air density (kg/m$^3$), u represents a relative rate between air and the vehicle (m/sec), and A represents a frontal projected area (m$^2$).

As is clear from the formula (1), the air resistance D is proportional to the air resistance coefficient CD (abbreviation for constant drag), and is a value proportional to the square of the relative rate u between air and the vehicle. Here, the relative rate u is equal to a traveling airflow rate. For example, when there is no wind, the relative rate u is a vehicle traveling rate.

The following elements (a) to (c) are a series of processes to reduce the air resistance D.

(a) How much does the air resistance coefficient CD diverge from a target?
(b) What is the cause of the separation from the target?
(c) How much can CD approach the target after the cause is dissolved?

The elements (a) and (c) can be revealed by the air resistance coefficient CD computed by precise computational fluid dynamics. However, it is difficult to precisely determine the element (b) only by a rate and pressure computed by the computational fluid dynamics.

Figure 7:
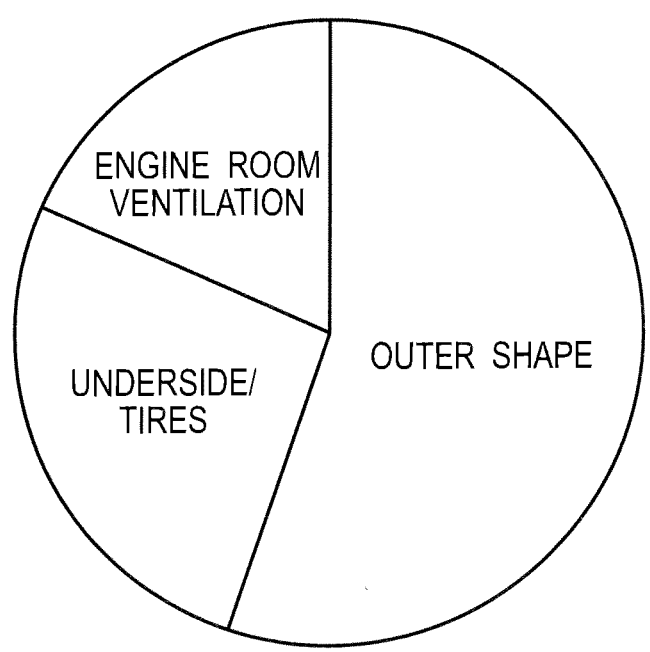
FIG. 7 is a pie chart showing a classification of resistance generation factors in a general vehicle (an engine-driven vehicle).

With regard to the air resistance D, FIG. 7 shows a classification of resistance generation factors of the air resistance in a general vehicle (an engine-driven vehicle). The main resistance generation factor is an outer shape of the vehicle as is clear from FIG. 7. However, the second biggest resistance generation factor is the underside/tires, which accounts for a larger part of the air resistance than an engine room ventilation. In other words, it cannot be said that the air resistance D depends only on exterior styling of the vehicle. Thus, it is also necessary to take into consideration the resistance generation factors of the underside/tires and the engine room ventilation (in the case of an electric vehicle, motor room ventilation).

Conventional improvements for the aerodynamic property to reduce the air resistance D have been made by focusing mainly on exterior styling of vehicles. However, in the case of a vehicle required to ensure comfortableness in a rear seat, for example, the improvement for the aerodynamic property by the exterior styling is inevitably limited because of the restriction on designing to ensure a living space in a rear seat. In other words, when a preferred aerodynamic property is set at a high level in order to increase a traveling range, an achievement of the preferred aerodynamic property cannot be expected only by improving the exterior styling of the vehicle.

In particular, in the case of an electric vehicle mounted with a battery in a limited space under a floor, it is crucial to increase a traveling range with a limited battery capacity on a full charge. In the electric vehicle, when any further improvement for the aerodynamic property by the exterior styling of the vehicle is not expected, a full reduction in air resistance caused by the entire underside/tires leads to a reduction in air resistance of the electric vehicle as a whole. The reduction in the air resistance of the entire electric vehicle directly leads to the increase in the traveling range. Thus, to reduce the air resistance caused by the entire underside/tires is a quite important technical problem.

In order to reduce the air resistance caused by the entire underside/tires, it is effective to provide the under cover on the underside to reduce the air resistance coefficient CD. The under cover is provided with the drain members to have a drainage property. It is necessary to prevent an increase in the air resistance by the drain members while the drainage capacity by the drain members is achieved.

[Function to Improve Aerodynamic Property by Entire Underside/Tires]

As described above, in the electric vehicle, a full reduction in the air resistance caused by the entire underside/tires is important for the increase in the traveling range. Hereinafter, a function to improve the aerodynamic property by the entire underside/tires in the electric vehicle EV according to Example 1 reflecting this object will be explained.

Figure 8:
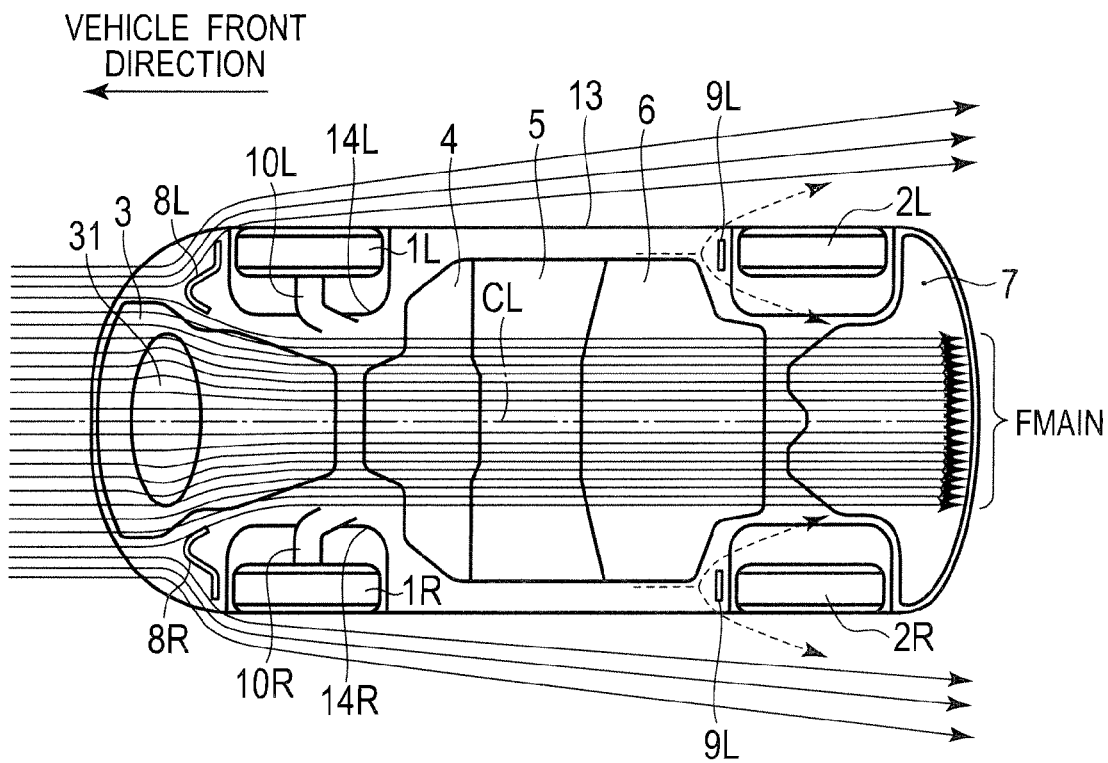
FIG. 8 is a view showing a traveling airflow flowing around entire underside/tires of the electric vehicle according to Example 1.

As shown in FIG. 8, almost the entire underside of the electric vehicle EV excluding the tires is covered with the under covers 3, 4, 5, 6 and 7. Thus, a continuous flat and smooth surface from the front side to the back side of the vehicle is achieved. As a result, the traveling airflow introduced from the front side of the vehicle forms a main streamline flux FMAIN passing through a center region around a vehicle center line CL. Accordingly, the traveling airflow introduced from the front side of the vehicle smoothly passes to the back side of the vehicle through the under covers 3, 4, 5, 6 and 7. In particular, since the rear under cover 7 covering the back portion of the underside has a diffuser structure, a function to promote the traveling airflow passing to the back side of the vehicle is also achieved. Thus, the traveling airflow tidily and smoothly passes over the center region from the front side to the back side of the vehicle so as to reduce the air resistance D in the center region.

In addition, as shown in FIG. 8, the electric vehicle EV is provided with the pair of front deflectors 8L and 8R in front of the pair of front tires 1L and 1R, respectively. The pair of front deflectors 8L and 8R prevents the traveling airflow from flowing along the front tires 1L and 1R during driving. As a result, the air resistance D around the front tires 1L and 1R is reduced since the traveling airflow is prevented from flowing around the front tires 1L and 1R, which is the main element to cause the increase in air resistance.

Further, as shown in FIG. 8, the electric vehicle EV is provided with the pair of rear deflectors 9L and 9R in front of the pair of rear tires 2L and 2R, respectively. Therefore, the traveling airflow is prevented from flowing adjacent to the rear tires 2L and 2R during driving. As a result, the air resistance D around the rear tires 2L and 2R is reduced since the traveling airflow around the rear tires 2L and 2R is avoided.

Still further, as shown in FIG. 8, the electric vehicle EV is provided with the rounded projection 31 in the front under cover 3 to control the airflow rate. Therefore, a spread of the traveling airflow introduced from the front side of the vehicle during driving is prevented so as to form the main streamline flux FMAIN passing through the front area around the vehicle center line CL. As a result, the air resistance D around the front area is reduced since the traveling airflow introduced from the front side of the vehicle is collected in the middle of the front area of the underside.

As described above, the electric vehicle EV according to Example 1 adopts the underfloor structure to improve the aerodynamic property of the entire underside/tires. Accordingly, it is possible to reduce the air resistance D of the entire underside/tires of the electric vehicle EV and thereby increase the traveling range.

[Water Drain Function and Traveling Airflow Adjusting Function by Drain Members]

As described above, in order to reduce the air resistance of the entire underside/tires in the electric vehicle, it is necessary to suppress the increase of the air resistance while ensuring the drainage capacity by the drain members provided in the under covers. Hereinafter, a water drain function and a traveling airflow adjusting function by the drain members D provided in the rear under cover 7 according to Example 1 reflecting this object will be explained.

In Example 1, as described above, almost the entire underside excluding the tires is covered with the under covers 3, 4, 5, 6 and 7. This is because the under covers have the effect of decreasing the air resistance coefficient CD in the underside of the vehicle and improving the aerodynamic property of the entire vehicle. However, the respective under covers are formed into a tray shape that stores water and mud water penetrating therein and therefore, a drain means is required. As conventional drain means, water drain holes exposed on cover surfaces are common means. Although an increase in air resistance can be suppressed by decreasing opening areas of the water drain holes, a drainage capacity is decreased since the amount of drained water per unit time is restricted. In addition, although the drainage capacity is increased by increasing the opening areas of the water drain holes, the air resistance is increased since a traveling airflow is introduced into the water drain holes. Thus, ensuring of the drainage capacity has a trade-off relationship and is difficult to manage in parallel with suppression of increase in air resistance.

However, Example 1 deals with the water drain function and the airflow adjusting function in parallel. In addition, Example 1 employs the drain member D in which the wall composing the recess is divided into the front inclined wall 21 and the rear inclined wall 22 by bending, the front inclined wall 21 is provided with the water drain opening 73, and the rear inclined wall 22 is provided with the traveling airflow adjusting surface 25.

Figure 9:
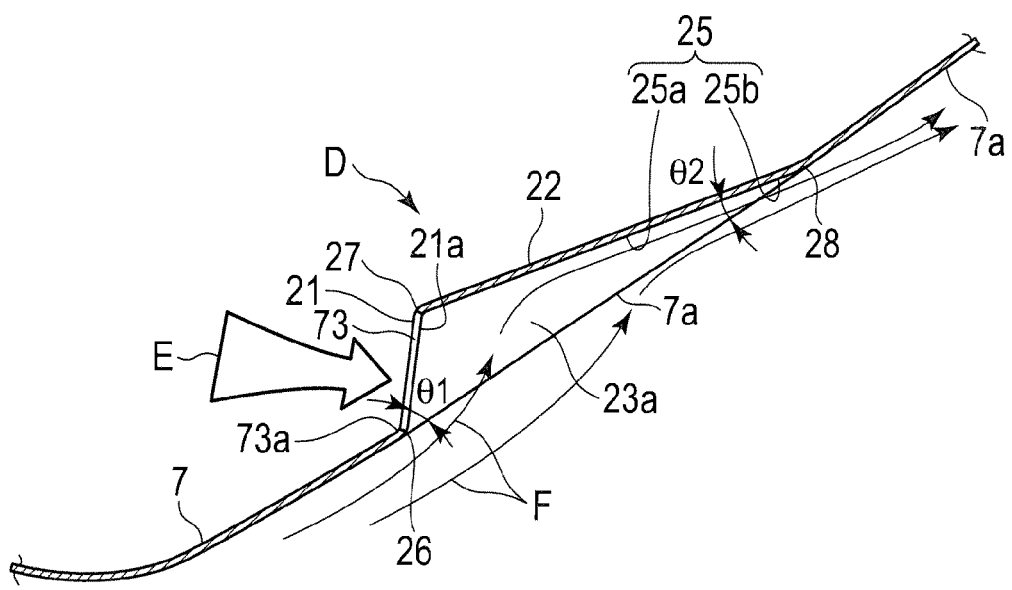
FIG. 9 is a view showing a traveling airflow flowing around the drain member, when a recess of the drain member is laterally viewed in vertical cross-section, in the underfloor structure according to Example 1 applied to the electric vehicle.

Therefore, the traveling airflow passing through the cover surface 7a of the rear under cover 7 during driving is introduced into the recess from the front wall end portion 26 extending in the vehicle width direction in the rear under cover 7. When the traveling airflow is introduced into the recess, as shown in FIG. 9, the traveling airflow comes into contact with the traveling airflow adjusting surface 25 of the rear inclined wall 22. As a result, the traveling airflow is deflected by the loose angle of the rear inclined wall 22 and adjusted to flow in smooth flow lines along the traveling airflow adjusting surface 25. Then, the traveling airflow smoothly passes over without separated from the rear wall end portion 28 extending in the vehicle width direction in the rear under cover 7 and passes through the cover surface 7a of the rear under cover 7 again.

In this case, the recess of the drain member D in the front-back direction is formed in such a manner that the first interior angle $\theta 1$ formed between the wall surface 21a of the front inclined wall 21 and the cover surface 7a is larger than the second interior angle $\theta 2$ formed between the wall surface 22a of the rear inclined wall 22 and the cover surface 7a. Therefore, the recess of the drain member D is formed approximately in a triangle in which a length of the wall surface 21a of the front inclined wall 21 is different from a length of the wall surface 22a of the rear inclined wall 22. Accordingly, as shown in FIG. 9, the traveling airflow introduced into the recess from the front wall end portion 26 reaches the traveling airflow adjusting surface 25 while flowing in the smooth flow lines gradually distanced from the water drain opening 73.

According to Example 1, the water drain opening 73 is provided in the front inclined wall 21 that can reduce the introduced amount of the traveling airflow even if the opening area is increased. Therefore, as indicated by an arrow E in FIG. 9, even if a large amount of water and mud water penetrating into the rear under cover 7 is stored, the stored water can be drained promptly.

In addition, the traveling airflow adjusting surface 25 is provided in the rear inclined wall 22 that directly receives the traveling airflow introduced into the recess. Therefore, as indicated by flow lines F in FIG. 9, even if the flow rate of the traveling airflow flowing in the recess is high, the traveling airflow is adjusted to flow in the flow lines that do not easily cause separation and turbulent flow. Namely, the traveling airflow smoothly flows along the rear under cover 7 so as to prevent an increase of the air resistance.

As described above, the drain member D of Example 1 has the recess composed of the two walls of the front inclined wall 21 and the rear inclined wall 22 formed by bending. In addition, the front inclined wall 21 is provided with the water drain opening 73, and the rear inclined wall 22 is provided with the traveling airflow adjusting surface 25. Further, the first interior angle θ1 formed by the front inclined wall 21 is larger than the second interior angle θ2 formed by the rear inclined wall 22, and the two wall surface lengths are different from each other. Accordingly, an increase of the air resistance is suppressed during driving while the drainage capacity by the rear under cover 7 is ensured and as a result, the aerodynamic property of the entire vehicle can be improved.

[Function of Drainage Capacity by Drain Members]

The drain members are required to ensure the drainage capacity necessary during driving in the rain in order to protect the components covered with the under covers from water influence. Hereinafter, a function of the drainage capacity by the drain members D provided in the rear under cover 7 of Example 1 reflecting this object will be explained.

In general, as described above, although an increase of the air resistance can be suppressed by decreasing the opening areas of the water drain holes, the drainage capacity is decreased since the amount of drained water per unit time is restricted due to the small opening areas. Thus, the ensuring of the drainage capacity has a relationship difficult to manage in parallel with the suppression of increase in air resistance.

Thus, Example 1 employs the following constitutions (A), (B) and (C).

(A) The first interior angle θ1 formed by the front inclined wall 21 is configured to be larger than the flowing angle of the traveling airflow introduced from the front wall end portion 26 of the rear under cover 7.

(B) The water drain opening 73 is formed along the circumference of the front inclined wall 21, and the opening front edge 73a of the water drain opening 73 is positioned in the area of the front wall end portion 26 from which the front inclined wall 21 is inclined upward.

(C) The width W between the wall surface 23a of the left wall 23 and the wall surface 24a of the right wall 24 facing each other in the vehicle width direction is gradually decreased from the front side to the back side of the vehicle.

The following is an explanation of a function according to the constitution (A). The water drain opening 73 is formed in the front inclined wall 21 inclined at the first interior angle θ1. The first inclined angle θ1 is configured to be larger than the flowing angle of the traveling airflow introduced into the recess. Therefore, as shown in FIG. 9, the traveling airflow reaches the traveling airflow adjusting surface 25 while flowing in the smooth flow lines gradually distanced from the water drain opening 73. In other words, the water drain opening 73 is separated from the traveling airflow, so as to allow for the increase in the opening area of the water drain opening 73.

The following is an explanation of a function according to the constitution (B). Due to the configuration of the water drain opening 73 having a rectangular shape along the circumference of the front inclined wall 21, a larger opening area can be obtained compared to the case of providing the water drain opening only in part of the front inclined wall 21. In addition, due to the configuration in which the opening front edge 73a of the water drain opening 73 is positioned in the area of the front wall end portion 26, water flowing from the front side of the vehicle can be smoothly drained through the opening front edge 73a of the water drain opening 73.

Figure 10:
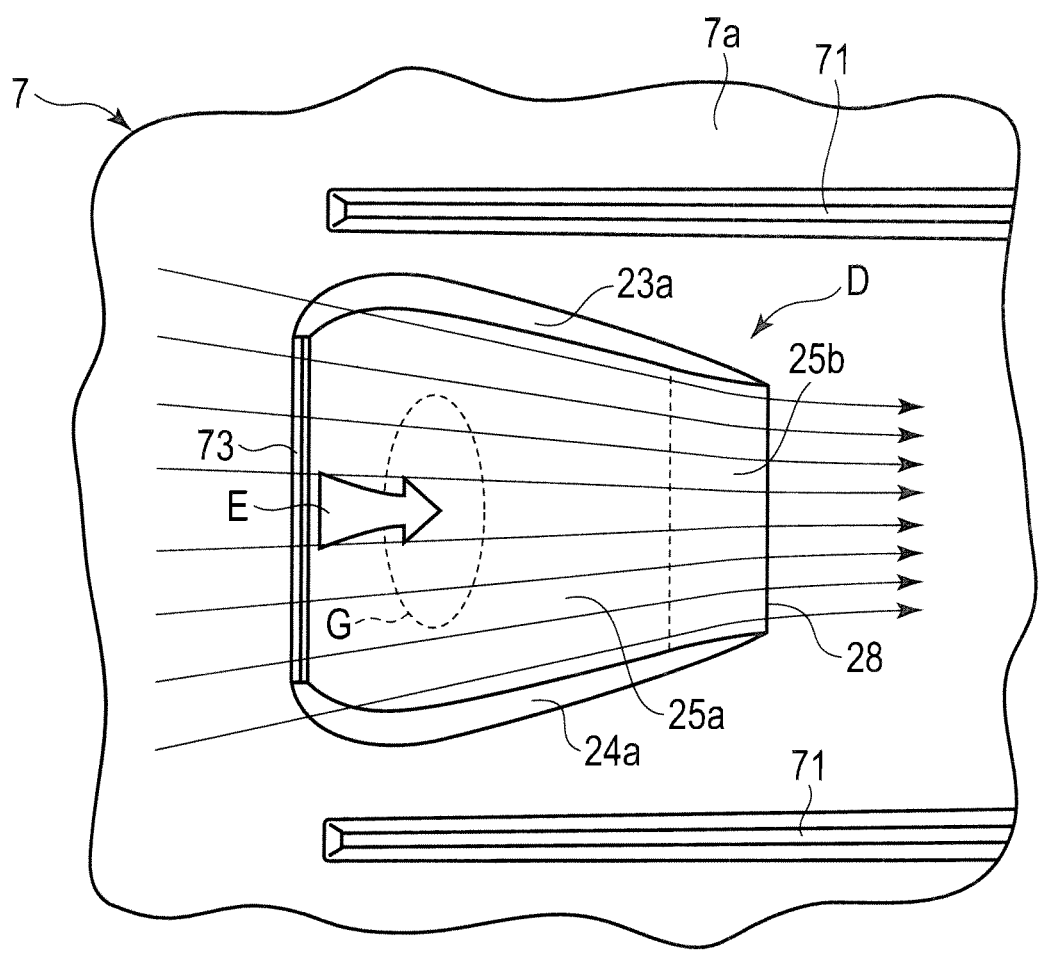
FIG. 10 is a view showing a traveling airflow flowing around the drain member, when the recess of the drain member is viewed directly from below, in the underfloor structure according to Example 1 applied to the electric vehicle.

The following is an explanation of a function according to the constitution (C). Due to the configuration of the two wall surfaces 23a and 24a facing each other composing a tapered nozzle structure, the flow rate of the traveling airflow along the traveling airflow adjusting surface 25 is gradually increased toward the back side of the vehicle as shown in FIG. 10. As a result, a pressure in an outlet area G of the water drain opening 73 is decreased with the increase of the flow rate of the traveling airflow, and a pressure difference between the inside and the outside of the water drain opening 73 is caused. As indicated by the arrow E in FIG. 10, the pressure difference provides a function to draw water outward from the water drain opening 73.

As described above, the drain member D of Example 1 is provided with the water drain opening 73 configured to be separated from the traveling airflow, and employs the constitutions (A), (B) and (C) in order to ensure the drainage capacity by the water drain opening 73. Accordingly, a desired drainage capacity can be achieved without any influence on the function to adjust the traveling airflow during driving.

[Function to Suppress Increase in Traveling Resistance by Drain Members]

An increase in traveling resistance by the drain members leads to an increase of the air resistance D by the entire underside/tires. Therefore, it is necessary to suppress the increase in the traveling resistance by the drain members. Hereinafter, a function to suppress the increase in the traveling resistance due to the drain members D provided in the rear under cover 7 of Example 1 reflecting this object will be explained.

As described above, the drainage capacity is generally increased with the increase of the opening areas of the water drain holes. However, since the traveling airflow around the water drain holes is disordered because of the introduction from the water drain holes with the increased opening areas, a vortex is caused and as a result, the air resistance is increased. Thus, the ensuring of the drainage capacity has a relationship difficult to manage in parallel with the suppression of increase in air resistance.

Thus, Example 1 employs the following constitutions (A), (D) and (E).

(A) The first interior angle θ1 formed by the front inclined wall 21 is configured to be larger than the flowing angle of the traveling airflow introduced from the front wall end portion 26 of the rear under cover 7.

(D) The second interior angle θ2 is configured to be able to prevent a deflection of flow line of the traveling airflow passing to the rear wall end portion 28 of the rear under cover 7 along the traveling airflow adjusting surface 25.

(E) The traveling airflow adjusting surface 25 is used as the wall surface of the rear inclined wall 22 including the flat surface 25a and the circular surface 25b.

As described in the section of "Function of drainage capacity by drain members", according to the constitution (A), the water drain opening 73 is separated from the traveling airflow so that an influence of the water drain opening 73 on the function to adjusting the traveling airflow is suppressed. Accordingly, a degree of design flexibility in the traveling airflow adjustment is increased.

The following is an explanation of a function according to the constitution (D). The second interior angle θ2 is configured to be able to prevent a deflection of flow line of the traveling airflow passing to the rear wall end portion 28. Accordingly, it is possible to prevent the traveling airflow passing to the rear wall end portion 28 from causing separation or turbulent flow as a cause of the traveling resistance.

The following is an explanation of a function according to the constitution (E). The traveling airflow adjusting surface 25 is used as the wall surface of the rear inclined wall 22 including the flat surface 25a and the circular surface 25b. Accordingly, the traveling airflow can flow through the rear wall end portion 28 in the tidy and smooth flow lines as shown in FIG. 9.

As described above, the drain member D of Example 1 is provided with the water drain opening 73 separated from the traveling airflow, and employs the constitutions (A), (D) and (E) in order to suppress an increase of the air resistance. Accordingly, it is possible to minimize the increase of the air resistance while ensuring a high drainage capacity due to the water drain opening 73.

In Example 1, each function was explained with reference to the drain member D provided with the water drain opening 73 in the rear under cover 7, and the explanation of the respective drain members provided with the other water drain openings 33, 34, 42, 43, 44, 72 and 74 was omitted. However, the other drain members have the same functions as the drain member D provided with the water drain opening 73.

Next, the effects will be explained. The underfloor structure of the electric vehicle EV according to Example 1 can obtain the following effects.

(1) The drain member D includes the front inclined wall 21 inclined upward toward the back side of the vehicle from the front wall end portion 26 extending in the vehicle width direction in the under cover, and provided with the water drain opening 73 penetrating at least part of the front inclined wall 21. In addition, the drain member D includes the rear inclined wall 22 inclined downward from the bent wall portion 27 connected to the front inclined wall 21 toward the rear wall end portion 28 extending in the vehicle width direction in the rear under cover 7, and provided with the traveling airflow adjusting surface 25 on the wall surface of the rear inclined wall 22 to adjust the traveling airflow. Further, the recess in the under cover in the front-back direction of the vehicle is formed in such a manner that the first interior angle θ1 formed by the front inclined wall 21 is larger than the second interior angle θ2 formed by the rear inclined wall 22, and the two wall surface lengths L1 and L2 are different from each other. Therefore, the aerodynamic property of the entire vehicle can be improved due to the suppression of increase in the air resistance while ensuring the drainage capacity of the under cover during driving.

(2) The first interior angle θ1 is configured to be larger than the flowing angle of the traveling airflow introduced from the front wall end portion 26 of the under cover. Therefore, in addition to the effect (1), the water drain opening 73 is definitely separated from the traveling airflow, so that an influence on the function to adjust the traveling airflow can be prevented even if the opening area of the water drain opening 73 is increased.

(3) The second interior angle θ2 is configured to be able to prevent a deflection of flow line of the traveling airflow flowing through the rear wall end portion 28 of the under cover along the traveling airflow adjusting surface 25. Therefore, in addition to the effect (1) or (2), it is possible to prevent the traveling airflow passing to the rear wall end portion 28 from causing separation or turbulent flow as a cause of the traveling resistance.

(4) The opening front edge 73a of the water drain opening 73 formed in the front inclined wall 21 is positioned in the area of the front wall end portion 26 from which the front inclined wall 21 is inclined upward. Therefore, in addition to the effects (1) to (3), it is possible to obtain the drainage capacity to smoothly drain water outward from the water drain opening 73.

(5) The traveling airflow adjusting surface 25 is used as the wall surface of the rear inclined wall 22, and includes the flat surface 25a extending from the bent wall portion 27 to the rear wall end portion 28, and the circular surface 25b smoothly connected to the cover surface 7a of the under cover (the rear under cover 7). Therefore, in addition to the effects (1) to (4), the traveling airflow can flow through the rear wall end portion 28 in the tidy and smooth flow lines even with the simple constitution.

(6) The drain member D includes the left wall 23 and the right wall 24 to cover the pair of triangle-shaped spaces facing each other in the vehicle width direction provided in such a manner that the front inclined wall 21 and the rear inclined wall 22 are inclined from the under cover to form the recess. In addition, the width W between the two wall surfaces 23a and 24a of the left wall 23 and the right wall 24 facing each other in the vehicle width direction is gradually decreased from the front side to the back side of the vehicle. Therefore, in addition to the effects (1) to (5), due to the nozzle structure to increase the flow rate of the traveling airflow in the recess, it is possible to obtain a high drainage capacity in addition to the function to draw water outward from the water drain opening 73.

(7) The under cover is the rear under cover 7 having the diffuser structure, and the drain member D is located in the inlet area of the diffuser structure. Therefore, in addition to the effects (1) to (6), since the diffuser structure can increase the flow rate of the traveling airflow toward the back side of the vehicle along the cover surface 7a of the under cover, it is possible to obtain a high drainage capacity in addition to the function to draw water outward from the water drain opening 73.

Although the vehicle underfloor structure according to Example 1 was explained, a change and addition of design can be allowed for the specific constitution thereof.

In Example 1, the recess in the front-back direction of the vehicle is formed into a triangle in which the first interior angle θ1 formed by the front inclined wall 21 is larger than the second interior angle θ2 formed by the rear inclined wall 22, and the two wall surface lengths are different from each other. Although the front inclined wall and the rear inclined wall are flat in Example 1, the front inclined wall and the rear inclined wall may be formed into a quadric curved shape or a tertiary curved shape as long as the conditions of the angles and the wall surface lengths are satisfied. In other words, for example, the recess in the front-back direction may be formed into an asymmetric dome shape.

In Example 1, the first interior angle $\theta 1$ is configured to be larger than the flowing angle of the traveling airflow introduced from the front wall end portion 26, and is set at approximately 50° in consideration of manufacturability by press molding. However, the set angle of the first interior angle $\theta 1$ is not limited to approximately 50°. For example, the first interior angle $\theta 1$ may be smaller than 50° or larger than 50° depending on the set value of the flowing angle of the traveling airflow. Further, as long as there is no disadvantage for manufacturability, the first interior angle $\theta 1$ is preferably closer to 90° so that the front inclined wall is further separated from the traveling airflow.

In Example 1, the second interior angle $\theta 2$ is configured to be able to prevent a deflection of flow line of the traveling airflow flowing through the rear wall end portion 28 along the traveling airflow adjusting surface 25, and is set at approximately 13°, which is within a possible range for designing. However, the set angle of the second interior angle $\theta 2$ is not limited to approximately 13°. For example, the second interior angle $\theta 2$ may be smaller than 13° or larger than 13° depending on the target value for suppressing an increase in traveling resistance. Further, as long as there is no disadvantage for designing, the second interior angle $\theta 2$ is preferably closer to 0° so that the traveling airflow can be introduced more smoothly.

In Example 1, the water drain opening 73 is formed approximately in the entire front inclined wall 21 in consideration of manufacturability by press molding, and the opening front edge 73a formed in the front inclined wall 21 is positioned in the area of the front wall end portion 26. However, the water drain opening may be formed in part of the front inclined wall 21 depending on the drainage capacity required. In addition, the opening front edge of the water drain opening may be positioned in the area above the front wall end portion.

In Example 1, the traveling airflow adjusting surface 25 is used as the wall surface of the rear inclined wall 22, and includes the flat surface 25 extending from the bent wall portion 27 to the rear wall end portion 28 and the circular surface 25b smoothly connected to the cover surface 7a of the rear under cover 7. However, the rear inclined wall 22 may be provided with an additional airflow adjusting member, and the traveling airflow adjusting surface may serve as the surface of the additional airflow adjusting member. In addition, the traveling airflow adjusting surface may be a flat surface, a circular surface, a curved surface or a combination surface thereof.

In Example 1, the width W between the two wall surfaces 23a and 24a of the left wall 23 and the right wall 24 facing each other in the vehicle width direction is gradually decreased from the front side to the back side of the vehicle. However, the front inclined wall and the rear inclined wall may be gently curved and connected to the under cover so as not to provide definite left wall and right wall. In addition, the two wall surfaces 23a and 24a may be parallel to each other so as to keep the width W constant. Alternatively, the width between the two wall surfaces 23a and 24a may be gradually increased toward the back side of the vehicle.

In Example 1, the underfloor structure of the present invention is applied to the electric vehicle EV. However, the underfloor structure of the present invention can also be applied not only to hybrid vehicles and fuel cell vehicles but also to engine-driven vehicles. In the case in which the present invention is applied to an electrically-powered vehicle such as the electric vehicle EV on which a battery is mounted, electric efficiency can be improved. In the case in which the present invention is applied to an engine-driven vehicle, fuel efficiency can be improved.

EXAMPLE 2

Hereinafter, the vehicle underfloor structure according to Example 2 of the present invention will be explained with reference to the drawings. Note that the same constitutions as Example 1 are indicated by the common reference numerals and the overlapped explanations thereof will not be repeated.

The entire underfloor structure of the electric vehicle EV according to Example 2 also includes the pair of front tires 1L and 1R, and the pair of rear tires 2L and 2R as shown in FIG. 1. The underfloor structure further includes the front under cover 3, the motor room rear under cover 4, the first battery under cover 5, the second battery under cover 6 and the rear under cover 7. Still further, the underfloor structure includes the pair of front deflectors 8L and 8R (an airflow adjusting structure), and the pair of rear deflectors 9L and 9R.

The two battery under covers 5 and 6 cover the bottom surface of the battery unit 16 (a plane projected region), and are connected to the motor room rear under cover 4 covering the area extending toward the front side of the vehicle (see FIG. 13). The triply-divided under covers 4, 5 and 6 are integrated to compose a battery under cover of Example 2.

Figure 11:
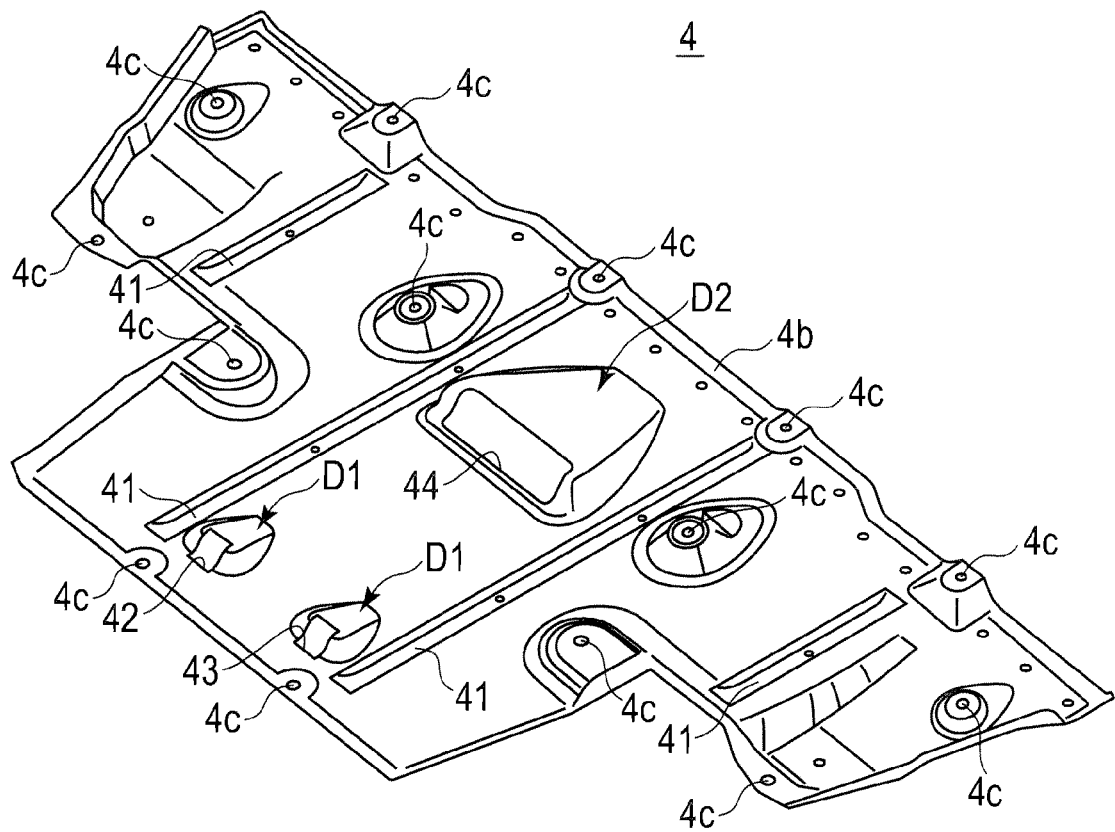
FIG. 11 is a perspective view showing a motor room rear under cover of an underfloor structure according to Example 2 as viewed from an upper front direction of a vehicle.
Figure 12:
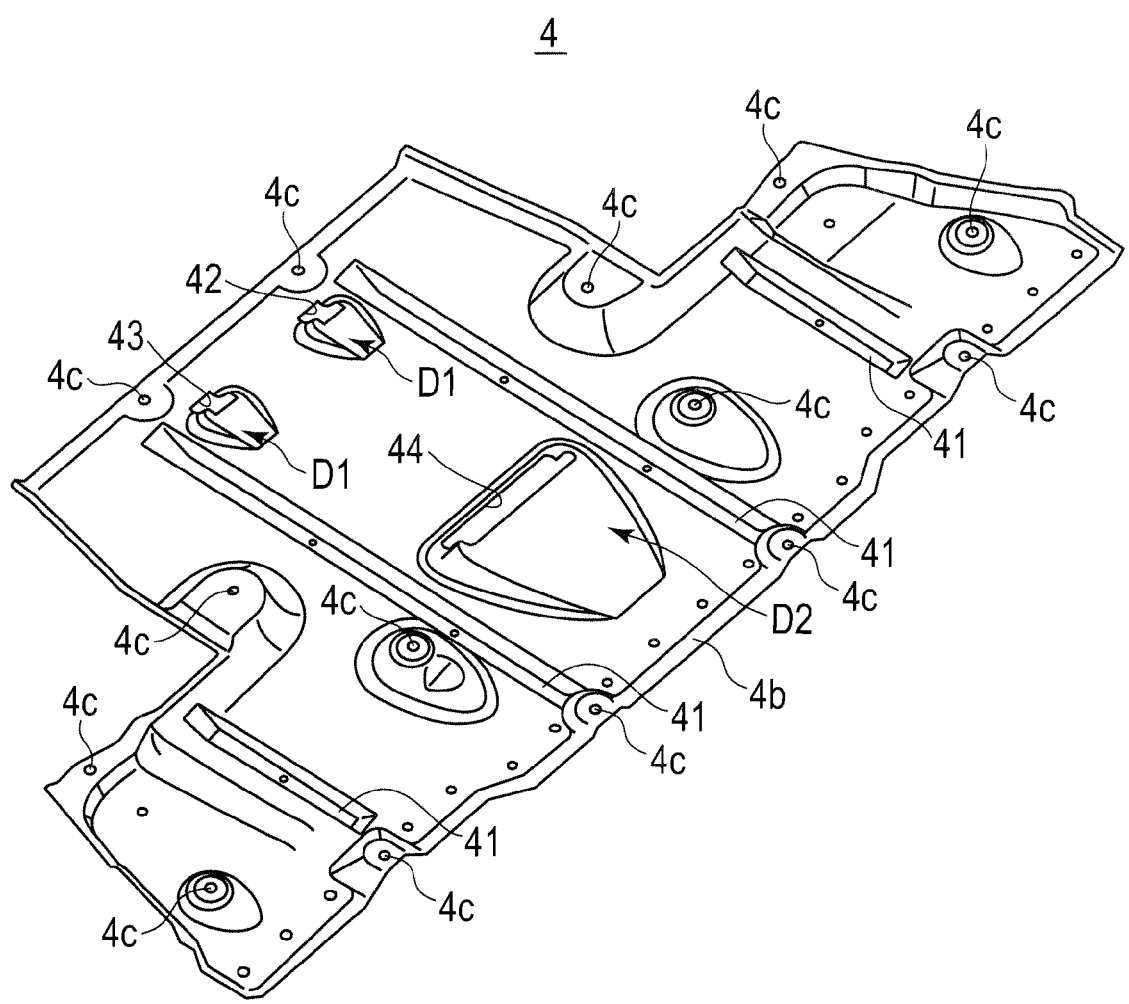
FIG. 12 is a perspective view showing the motor room rear under cover as viewed from an upper back direction of the vehicle.

FIGS. 11 and 12 are perspective views showing the motor room rear under cover 4 in the underfloor structure according to Example 2. As shown in FIGS. 11 and 12, the motor room rear under cover 4 is formed into a tray shape that covers the front side of the center region of the vehicle and stores water and mud water. The motor room rear under cover 4 is made of synthetic resin integrally formed by press molding.

The motor room rear under cover 4 is provided with the four elongated projections 41 extending in the front-back direction of the vehicle. The motor room rear under cover 4 is further provided with two first drain members D1 having the two water drain openings 42 and 43 with small opening areas located on the front side between the two elongated projections 41 and 41 in the middle portion. Still further, the motor room rear under cover 4 is provided with a second drain member D2 having the water drain opening 44 with a large opening area located on the back side between the two elongated projections 41 and 41 in the middle portion. The motor room rear under cover 4 includes a cover connecting groove 4b formed in the vehicle width direction in the rear end portion thereof to connect the motor room rear under cover 4 to the first battery under cover 5. In addition, the motor room rear under cover 4 includes bolt holes 4c formed on the periphery thereof. Thus, the motor room rear under cover 4 is fixed on the front side in the center region of the vehicle by bolts inserted into the plural bolt holes 4c and fastened tightly.

FIGS. 13 to 16 are views showing the first drain members D1 and the second drain member D2 provided in the motor room rear under cover 4 in the underfloor structure according to Example 2. The following are explanations of the first drain members D1 provided with the water drain openings 42 and 43 and the second drain member D2 provided with the water drain opening 44 with reference to FIGS. 13 to 16.

As shown in FIG. 13, the vehicle structure in the area provided with the motor room rear under cover 4 includes the motor room rear under cover 4, the front suspension member 14, the battery unit 16, a dash panel 17 and a floor panel 18.

The motor room rear under cover 4 is located between the front suspension member 14 and the battery unit 16, and includes the first drain members D1 having the water drain openings 42 and 43 and the second drain member D2 having the water drain opening 44.

The front suspension member 14 has a square-shaped beam-like structure in a state of closed cross-section to elastically support a pair of suspension links.

The battery unit 16 includes a battery cell laminated body, wiring, a circuit board and the like loaded in a battery case having a high rigid structure and sealing property.

The dash panel 17 is provided in the vehicle width direction above the front suspension member 14. The dash panel 17 is integrally connected to the floor panel 18 composing the floor inside the vehicle. A motor room rear space continuous with the motor room 15 mounted with a driving motor is provided between the dash panel 17 and the floor panel 18, and the front suspension member 14.

Figure 14:
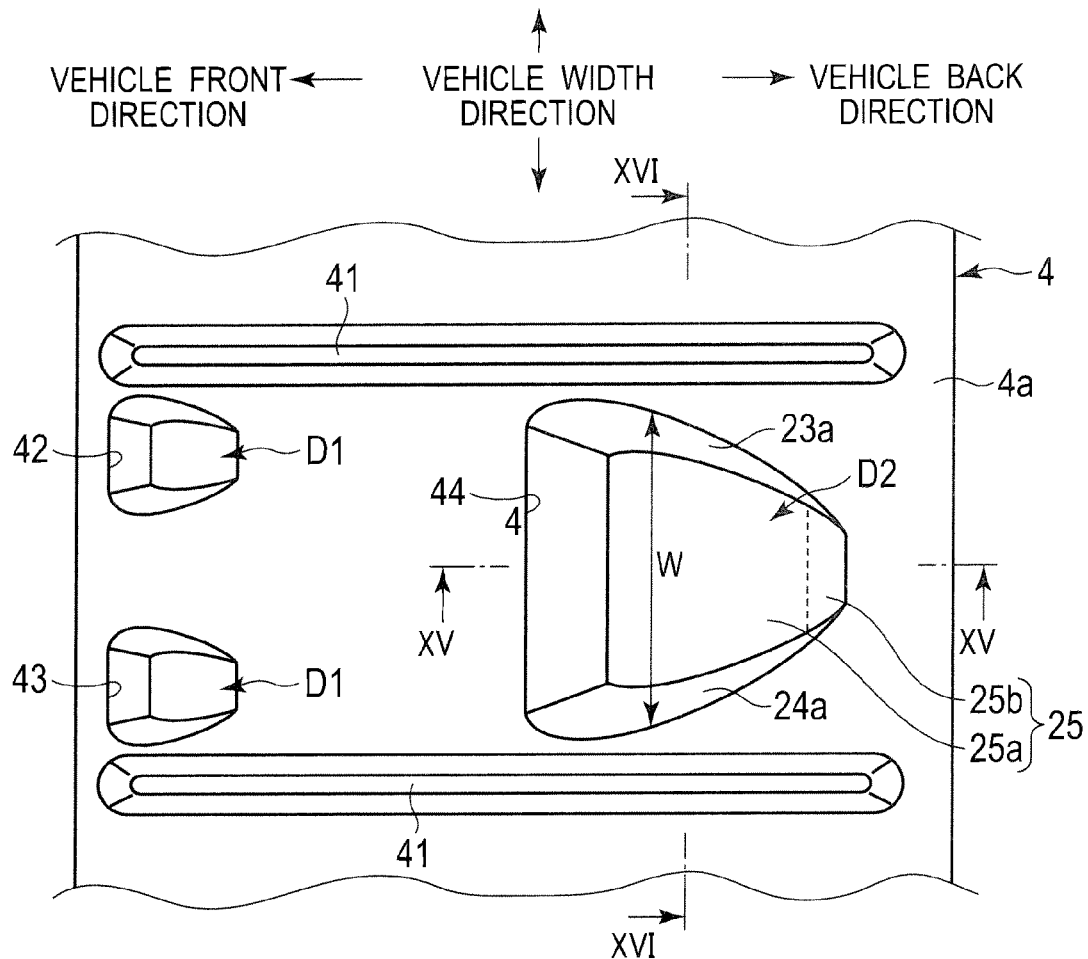
FIG. 14 is a view showing drain members provided in the motor room rear under cover as viewed from the underside of the vehicle.
Figure 15:
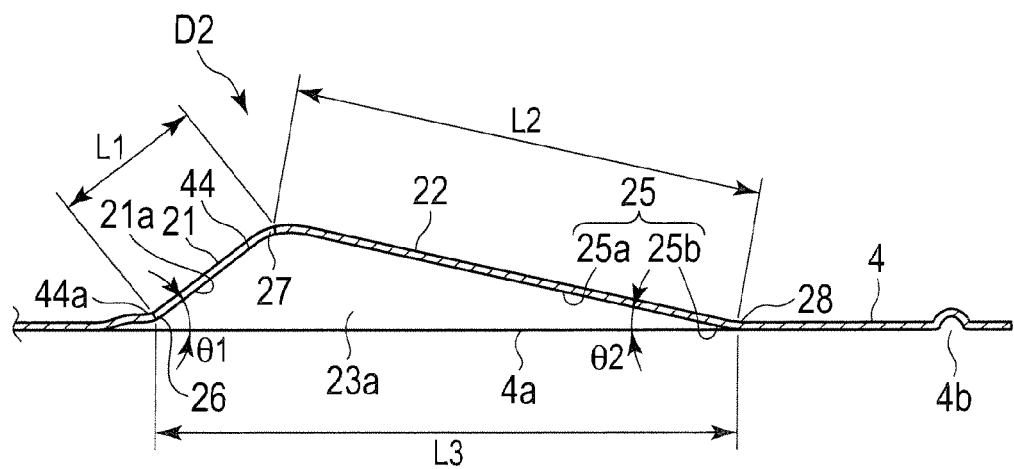
FIG. 15 is a cross-sectional view taken along the line XV-XV in FIG. 14.
Figure 16:
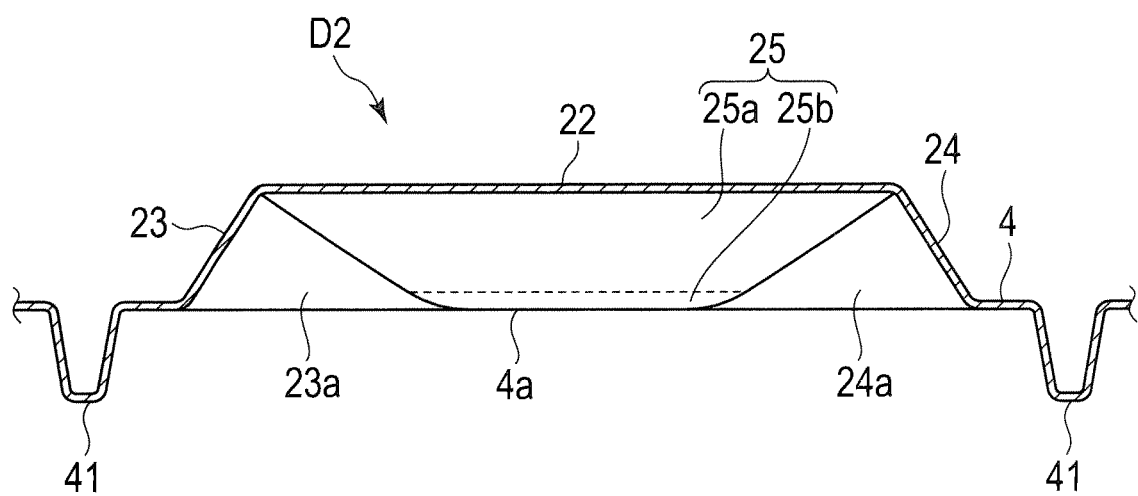
FIG. 16 is a cross-sectional view taken along the line XVI-XVI in FIG. 14.

As shown in FIGS. 14 to 16, the first drain members D1 and the second drain member D2 each include the front inclined wall 21, the rear inclined wall 22, the left wall 23, the right wall 24, the water drain opening 44 and the traveling airflow adjusting surface 25, as in the case of Example 1. In other words, the recessed space is provided in front of the battery unit 16 in the motor room rear under cover 4, and surrounded by the front inclined wall 21, the rear inclined wall 22, the left wall 23 and the right wall 24. The front inclined wall 21 is provided with the water drain opening 44, and the rear inclined wall 22 is provided with the traveling airflow adjusting surface 25.

According to the above-described constitution, "the function to improve the aerodynamic property by the entire underside/tires" and "the function to suppress an increase in the traveling resistance by the drain members" identical to Example 1 can be obtained. In addition, "the water drain function and the traveling airflow adjusting function by the drain members" and "the function of the drainage capacity by the drain members" identical to Example 1 can also be obtained, and will be further described in detail below by adding the constitution of Example 2.

[Water Drain Function and Traveling Airflow Adjusting Function by Drain Members]

Example 2 also employs the constitution in which almost the entire underside of the vehicle excluding the tires is covered with the under covers 3, 4, 5, 6 and 7 as in the case of Example 1. In order to deal with the water drain function and the airflow adjusting function in parallel as in the case of Example 1, the first and second drain members D1 and D2 have the constitution in which the wall composing the recess of each drain member is divided into the two parts of the front inclined wall 21 and the rear inclined wall 22. In addition, the front inclined wall 21 is provided with the water drain opening 73, and the rear inclined wall 22 is provided with the traveling airflow adjusting surface 25.

Figure 17:
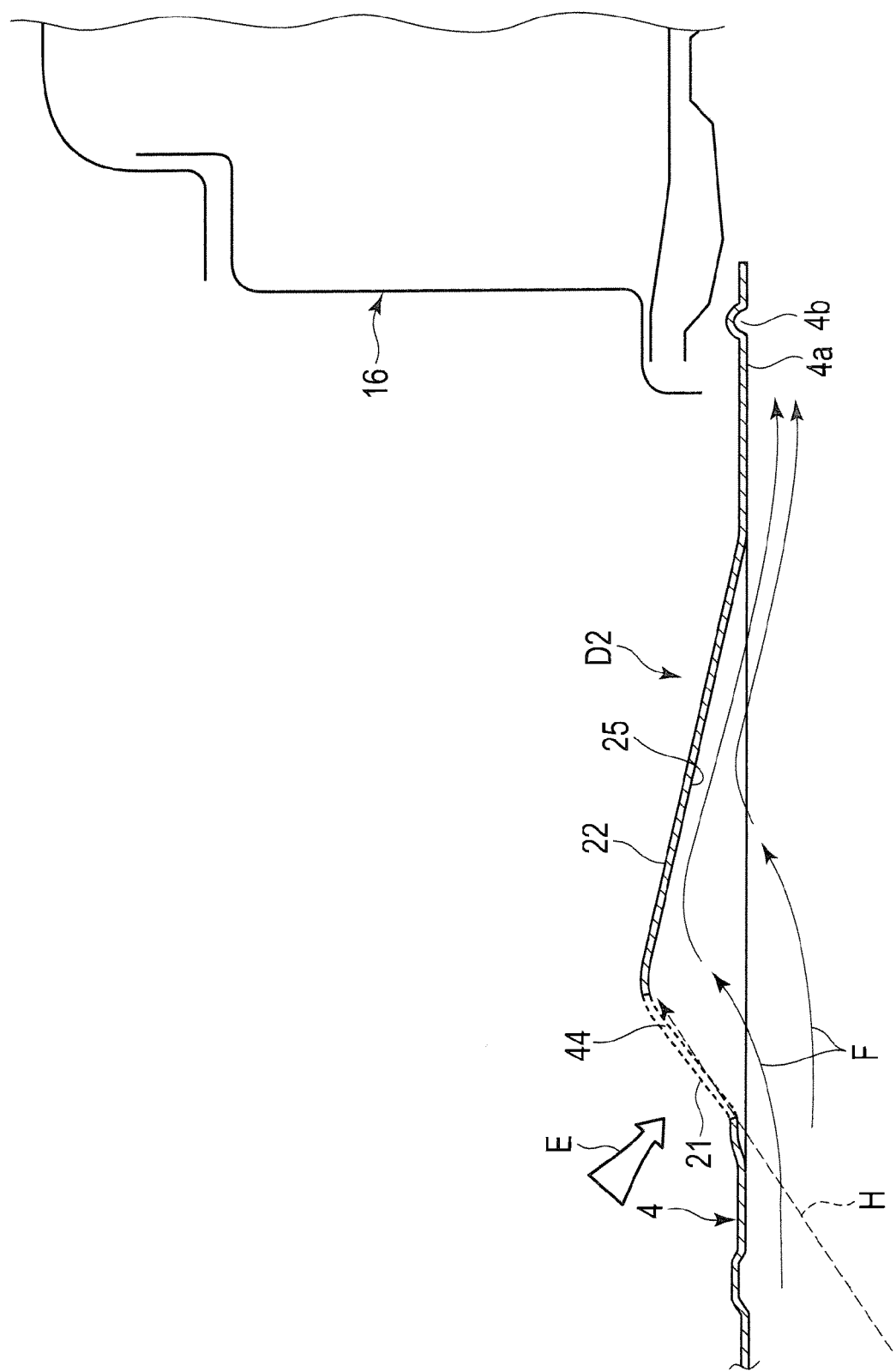
FIG. 17 is an explanatory view showing a traveling airflow and a drain water flow flowing around the drain member provided with a water drain opening 44 in the underfloor structure according to Example 2 applied to the electric vehicle.

Thus, the traveling airflow along a cover surface 4a of the motor room rear under cover 4 during driving is introduced into the recess from the front wall end portion 26 extending in the vehicle width direction in the motor room rear under cover 4. When the traveling airflow is introduced into the recess, as shown in FIG. 17, the traveling airflow comes into contact with the traveling airflow adjusting surface 25 of the rear inclined wall 22. As a result, the traveling airflow is deflected by the loose angle and adjusted to flow in the smooth flow lines F along the traveling airflow adjusting surface 25. Then, the traveling airflow smoothly passes over without separated from the rear wall end portion 28 extending in the vehicle width direction in the motor room rear under cover 4 and passes through the cover surface 4a of the motor room rear under cover 4 again.

In this case, the first interior angle $\theta 1$ formed between the wall surface 21a of the front inclined wall 21 and the cover surface 4a is larger than the second interior angle $\theta 2$ formed between the wall surface 22a of the rear inclined wall 22 and the cover surface 4a, and the two wall surface lengths are different from each other. Accordingly, as shown in FIG. 17, the traveling airflow introduced into the recess from the front wall end portion 26 reaches the traveling airflow adjusting surface 25 while flowing in the smooth flow lines F gradually distanced from the water drain opening 44.

Thus, the water drain opening 44 can reduce the introduced amount of the traveling airflow even if the opening area thereof is increased. Further, the water drain opening 44 is provided in the front inclined wall 21 in order for water to be hardly introduced from a road surface to the battery unit 16 as indicated by an arrow H in FIG. 17. Therefore, as indicated by the arrow E in FIG. 17, even if a large amount of water and mud water penetrating into the motor room rear under cover 4 is stored, the stored water can be drained promptly.

In addition, the traveling airflow adjusting surface 25 is provided in the rear inclined wall 22 that directly receives the traveling airflow introduced into the recess. Therefore, as indicated by the flow lines F in FIG. 17, even if the flow rate of the traveling airflow flowing in the recess is high, the traveling airflow is adjusted to flow in the flow lines that do not cause separation and turbulent flow. Namely, the traveling airflow smoothly flows along the motor room rear under cover 4 so as to suppress an increase of the air resistance.

[Function of Drainage Capacity by Drain Members]

The drain members of Example 2 are required to ensure the drainage capacity necessary when driving in the rain in order to protect the battery unit covered with the under cover from water influence. In particular, in order to protect the battery unit 16 from being soaked, the motor room rear under cover 4 is required to ensure the drainage capacity to promptly drain water entering from the motor room 15 and water flowing over the front suspension member 14.

Thus, Example 2 employs the following constitutions (A), (B), (C) and (D).

(A) The first interior angle $\theta 1$ formed by the front inclined wall 21 is configured to be larger than the flowing angle of the traveling airflow introduced from the front wall end portion 26 of the motor room rear under cover 4.

(B) The water drain opening 44 is formed into a rectangular shape along the circumference of the front inclined wall 21, and an opening front edge 44a of the water drain opening 44 is positioned in the area of the front wall end portion 26 from which the front inclined wall 21 is inclined upward.

(C) The drain members include the first drain members D1 located immediately on the back side of the front suspension member 14, and the second drain member D2 immediately in front of the battery unit 16. In addition, the opening area of the water drain opening of the second drain member D2 is configured to be larger than the opening area of the water drain opening of the respective first drain members D1.

(D) The drain members are provided in the region of the main streamline flux FMAIN of the traveling airflow passing through the center region of the vehicle around the vehicle center line CL in the motor room rear under cover 4.

The following is an explanation of a function according to the constitution (A). The water drain opening 44 is fainted in the front inclined wall 21 inclined at the first interior angle θ1. The first inclined angle θ1 is configured to be larger than the flowing angle of the traveling airflow introduced into the recess. Therefore, as shown in FIG. 17, the traveling airflow reaches the traveling airflow adjusting surface 25 while flowing in the smooth flow lines F gradually distanced from the water drain opening 44. In other words, the water drain opening 44 is separated from the traveling airflow so as to allow for the increase in the opening area of the water drain opening 44.

The following is an explanation of a function according to the constitution (B). Due to the configuration of the water drain opening 44 formed into a rectangular shape along the circumference of the front inclined wall 21, a larger opening area can be obtained compared to the case of providing the water drain opening only in part of the front inclined wall 21. In addition, due to the configuration in which the opening front edge 44a of the water drain opening 44 is positioned in the area of the front wall end portion 26, water flowing from the front side of the vehicle can be smoothly drained outward through the water drain opening 44.

Figure 18:
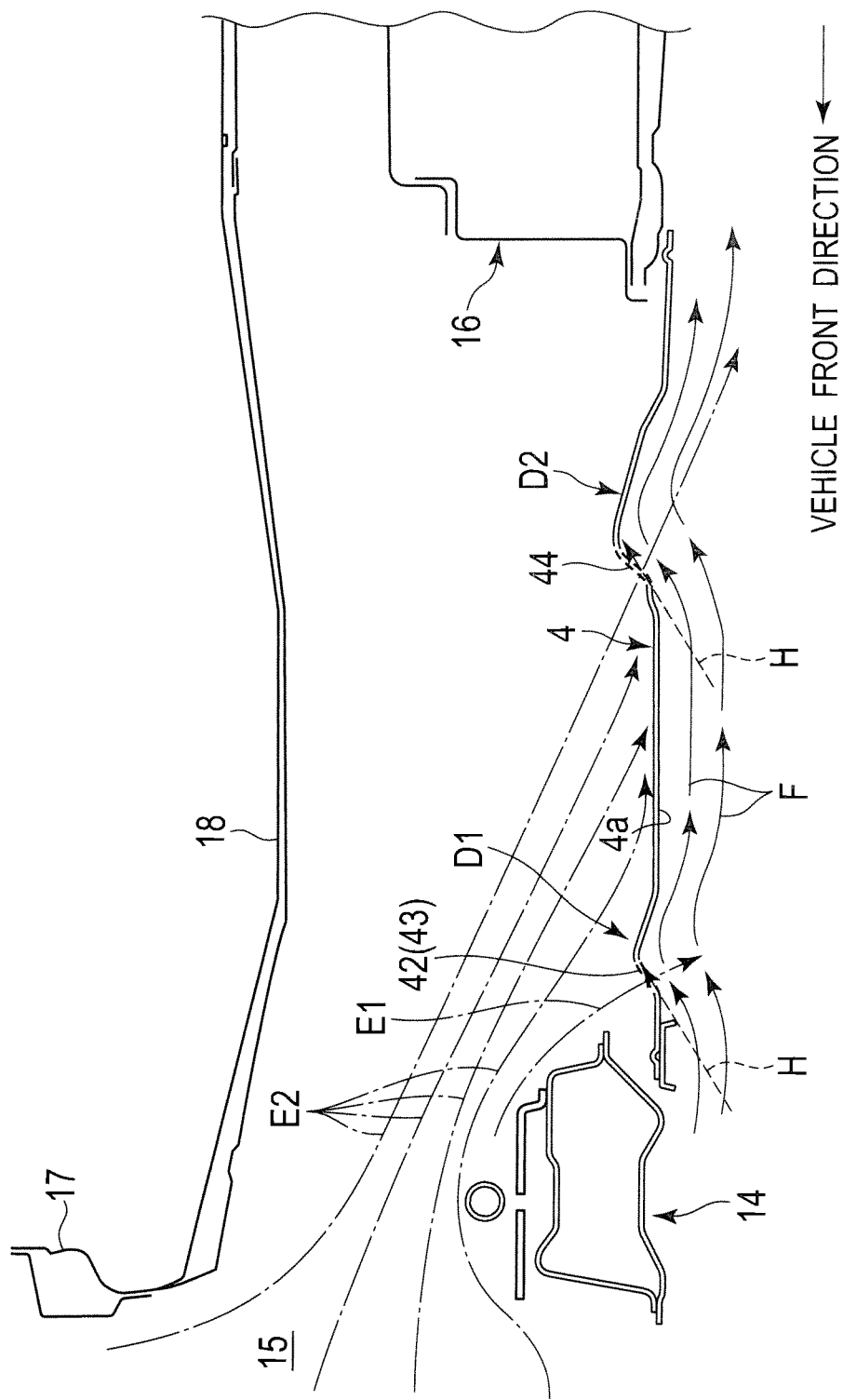
FIG. 18 an explanatory view showing a traveling airflow and a drain water flow flowing around the drain members provided with a water drain opening 43 and the water drain opening 44 in the underfloor structure according to Example 2 applied to the electric vehicle.

The following is an explanation of a function according to the constitution (C). As shown in FIG. 18, the water penetrating into the motor room rear under cover 4 includes water E1 flowing over the front suspension member 14 and water E2 entering from the motor room 15. The flow volume of the water E1 is relatively small, and the flow volume of the water E2 is large. In the case of trying to drain the penetrating water by one drain member, the drain member having the water drain opening with the large opening area is provided in the middle of the motor room rear under cover 4 in the front-back direction of the vehicle. However, such a case has a disadvantage in the traveling resistance because the depth of the recess in the motor room rear under cover 4 is increased. In addition, the penetrating water stored immediately in front of the battery unit 16 cannot be drained, which is disadvantageous for the property to protect the battery unit 16 from being soaked.

Thus, according to Example 2, the first drain members D1 are assigned to drain a small amount of the water E1 flowing over the front suspension member 14. Further, the second drain member D2 is assigned to drain a large amount of the water E2 entering from the motor room 15. Therefore, the case of draining the water by use of the first drain members D1 and the second drain member D2 has an advantage in the traveling resistance since the depth of each recess in the motor room rear under cover 4 is deceased compared to the case of draining the water by one drain member. In addition, the penetrating water E1 stored immediately on the back side of the front suspension member 14 is drained by the first drain members D1, and the penetrating water E2 stored immediately in front of the battery unit 16 is drained by the second drain member D2. In this case, the opening area of the water drain opening 44 of the second drain member D2 is configured to be larger than the total opening area of the water drain openings 42 and 43 of the first drain members D1. Accordingly, the first drain members D1 and the second drain member D2 can drain the penetrating water E1 and E2 different in flow amount, respectively.

The following is an explanation of a function according to the constitution (D). The underfloor structure according to Example 2 includes the pair of front deflectors 8L and 8R and the rounded projection 31 serving as an airflow adjusting structure to collect the traveling airflow entering from the front side of the vehicle into the center region to introduce to the motor room rear under cover 4. Therefore, the flow rate of the traveling airflow reaches a peak in the region of the main streamline flux FMAIN of the traveling airflow passing through the center region of the vehicle around the vehicle center line CL.

Figure 19:
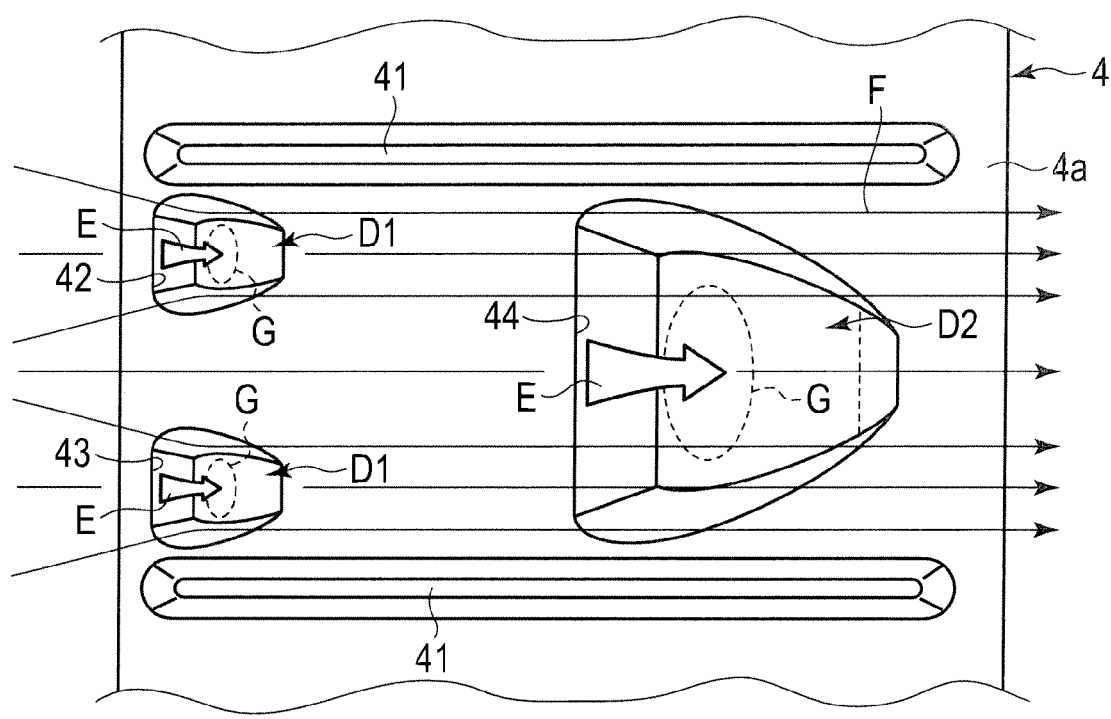
FIG. 19 is an explanatory view showing a traveling airflow introduced into the drain members provided in the motor room rear under cover.

As a result, as indicated by the flow lines in FIG. 19, the pressure in the outlet area G of the respective water drain openings 42, 43 and 44 is decreased with the high flow rate of the traveling airflow, so that a pressure difference between the inside and the outside of the respective water drain openings 42, 43 and 44 is caused. As indicated by the arrow E in FIG. 19, the pressure difference provides a function to draw the water outward from the water drain opening 44.

As described above, the first drain members D1 and the second drain member D2 of Example 2 are respectively provided with the water drain openings 42, 43 and 44 configured to be separated from the traveling airflow, and employ the constitutions (A), (B), (C) and (D) in order to ensure the drainage capacity by the water drain openings 42, 43 and 44. Accordingly, the required drainage capacity can be achieved without any influence on the function to adjust the traveling airflow during driving.

Next, the effects will be explained. The underfloor structure of the electric vehicle EV according to Example 2 can obtain the following effects.

(1) The battery under cover includes the battery covers (the first and second battery under covers 5 and 6) covering the bottom surface of the battery unit 16, and the front cover (the motor room rear under cover 4) covering the area extending from the battery covers toward the front side of the vehicle. The front cover is provided with the drain members (the first and second drain members D1 and D2) to drain the water penetrating into the front cover toward the road surface. The respective drain members include the front inclined wall 21 and the rear inclined wall 22, in which the first interior angle θ1 faulted by the front inclined wall 21 is larger than the second interior angle θ2 formed by the rear inclined wall 22, and the two wall surface lengths are different from each other. Therefore, the aerodynamic property of the entire vehicle can be improved due to the suppression of increase in the air resistance while preventing the battery unit 16 located under the floor from being soaked during driving.

(2) The first interior angle θ1 is configured to be larger than the flowing angle of the traveling airflow introduced from the cover surface 4a of the front cover. Therefore, in addition to the effect (1), the water drain openings 42, 43 and 44 are definitely separated from the traveling airflow, so that an influence on the function to adjust the traveling airflow can be prevented even if the opening areas of the respective water drain openings 42, 43 and 44 are increased.

(3) The second interior angle θ2 is configured to be able to prevent a deflection of flow line of the traveling airflow passing to the cover surface 4a of the front cover along the traveling airflow adjusting surface 25. Therefore, in addition to the effect (1) or (2), it is possible to prevent the traveling airflow passing to the cover surface 4a of the front cover from causing separation or turbulent flow as a cause of the traveling resistance.

(4) The front cover covers the area between the back of the front suspension member 14 and the front of the battery unit 16. The drain members in the front cover include the first drain members D1 located immediately on the back side of the front suspension member 14, and the second drain member D2 located immediately in front of the battery unit 16. Therefore, in addition to the effects (1) to (3), it is possible to ensure a high drainage capacity to hardly store water in the front cover due to the double drain function with respect to each water entering route.

(5) The opening area of the second drain member D2 is configured to be larger than the opening area of each first drain member D1. Therefore, in addition to the effect (4), water entering the front cover can be efficiently drained due to the each setting of the opening area with respect to each water entering route.

(6) The underfloor structure includes the airflow adjusting structure (the front deflectors 8L and 8R, the rounded projection 31) to collect the traveling airflow entering from the front side of the vehicle into the center region to introduce to the front cover. Further, the drain members are provided in the region of the main streamline flux FMAIN of the traveling airflow passing through the center region of the vehicle around the vehicle center line CL in the front cover. Therefore, in addition to the effects (1) to (5), water can be drawn outward from the water drain openings 42, 43 and 44 since the drain members are provided in the region of the main streamline flux FMAIN in which the traveling airflow flows at the fastest rate in the underside.

Although the underfloor structure of the electric vehicle of the present invention was explained based on Example 2, the present invention is not limited to Example 2 and a change and addition of design can be allowed for the specific constitution thereof.

In Example 2, the battery cover is divided into the two parts of the first battery under cover 5 and the second battery under cover 6, and the motor room rear under cover 4 is used as the front cover, so as to compose the triply-divided underfloor structure. However, a dually-divided underfloor structure may be employed without dividing the battery cover into the two parts. Alternatively, the battery cover may be integrated with the front cover without being divided.

In Example 2, the first drain members D1 are provided on the front side of the motor room rear under cover 4, and the second drain member D2 is provided on the back side of the motor room rear under cover 4 (immediately in front of the battery unit 16). However, the number, the layout and the water drain opening area of the drain members of the present invention are not particularly limited as long as at least one drain member is provided in the front cover to protect the battery unit from water influence.

Example 2 explains the case in which the front deflectors 8L and 8R and the rounded projection 31 are used as the airflow adjusting structure to collect the traveling airflow entering from the front side of the vehicle into the center region so as to introduce to the motor room rear under cover 4. However, the airflow adjusting structure is not limited to this configuration as long as the traveling airflow entering from the front side of the vehicle can be collected to the center region. For example, an airflow adjusting structure in which only the front deflectors are used or in which only the rounded projection is used, other airflow adjusting structures, or a combination of other airflow adjusting structures may be used.

The entire contents of Japanese Patent Application No. P2010-089340 (filed on Apr. 8, 2010) and Japanese Patent Application No. P2010-092797 (filed on Apr. 14, 2010) are herein incorporated by reference.

Although the present invention has been described above by reference to the embodiment, the present invention is not limited to the description thereof, and it will be apparent to those skilled in the art that various modifications and improvements can be made within the scope of the present invention.

INDUSTRIAL APPLICABILITY

According to the vehicle underfloor structure of the present invention, an increase in the air resistance is suppressed during driving while the drainage capacity in the under cover is ensured. Therefore, the aerodynamic property of the entire vehicle can be improved.

REFERENCE SIGNS LIST

θ1 First interior angle
θ2 Second interior angle
D Drain member
3, 4, 5, 6, 7 Under cover
21 Front inclined wall
22 Rear inclined wall
23 Left wall
24 Right wall
25 Traveling airflow adjusting surface
26 Front wall end portion
27 Bent wall portion
28 Rear wall end portion
33, 34, 42, 43, 44, 72, 74 Water drain opening

The invention claimed is:

1. A vehicle underfloor structure, comprising:
an under cover that covers an underside of a vehicle; and
a drain member provided at least in a center region in a vehicle width direction in the under cover, including:
a front inclined wall inclined upward toward a back of the vehicle from a front wall end portion extending in the vehicle width direction in the under cover, and provided with a water drain opening penetrating at least part of the front inclined wall; and
a rear inclined wall inclined downward from a bent wall portion connected to the front inclined wall toward a rear wall end portion extending in the vehicle width direction in the under cover, and including a traveling airflow adjusting surface provided in a wall surface of the rear inclined wall to adjust a traveling airflow,
wherein a recess is formed in the under cover in a front-back direction of the vehicle in such a manner that a first interior angle formed by the front inclined wall is larger than a second interior angle formed by the rear inclined wall, and a length of the front inclined wall is different from a length of the rear inclined wall.

2. The vehicle underfloor structure according to claim 1, wherein the first interior angle is larger than a flowing angle of the traveling airflow entering from the front wall end portion of the under cover.

3. The vehicle underfloor structure according to claim 1, wherein the second interior angle is configured to be able to prevent a deflection of a flow line of the traveling airflow flowing along the traveling airflow adjusting surface to the rear wall end portion of the under cover.

4. The vehicle underfloor structure according to claim 1, wherein an opening front edge of the water drain opening formed in the front inclined wall is located in a region of the front wall end portion from which the front inclined wall is inclined upward.

5. The vehicle underfloor structure according to claim 1, wherein the traveling airflow adjusting surface serves as the wall surface of the rear inclined wall, and includes a flat surface extending from the bent wall portion to the rear wall end portion and a circular surface smoothly connected to a cover surface of the under cover.

6. The vehicle underfloor structure according to claim 1, wherein the drain member further includes a left wall and a right wall to cover a pair of triangle-shaped spaces which face each other in the vehicle width direction, and are provided in such a manner that the front inclined wall and the rear inclined wall are inclined from the under cover to form the recess, and a width between two wall surfaces of the left wall and the right wall facing each other in the vehicle width direction is gradually decreased from a front side to a back side of the vehicle.

7. The vehicle underfloor structure according to claim 1, wherein the under cover is a rear under cover having a diffuser structure, and the drain member is located in an inlet area of the diffuser structure.

8. The vehicle underfloor structure according to claim 1, wherein the under cover includes: a battery cover to cover a bottom surface of a battery unit mounted under a floor of the vehicle; and a front cover to cover an area extending from the battery cover toward a front side of the vehicle, and the drain member is provided in the under cover.

9. The vehicle underfloor structure according to claim 8, wherein the first interior angle is larger than a flowing angle of the traveling airflow entering from a cover surface of the front cover.

10. The vehicle underfloor structure according to claim 8, wherein the second interior angle is configured to be able to prevent a deflection of a flow line of the traveling airflow flowing along the traveling airflow adjusting surface to the cover surface of the front cover.

11. The vehicle underfloor structure according to claim 1, wherein the front cover covers an area between a back of a front suspension member and a front of the battery unit in the front-back direction of the vehicle, and the drain member in the front cover includes a first drain member located immediately on a back side of the front suspension member, and a second drain member located immediately in front of the battery unit.

12. The vehicle underfloor structure according to claim 11, wherein an opening area of the second drain member is larger than an opening area of the first drain member.

13. The vehicle underfloor structure according to claim 8, further comprising an airflow adjusting structure to collect the traveling airflow entering from a front side of the vehicle into a center region to introduce to the front cover, wherein the drain member is provided in a region of a main streamline flux of the traveling airflow passing through the center region around a vehicle center line in the front cover.

14. The vehicle underfloor structure according to claim 1, wherein at least the center region in the vehicle width direction in the underside of the vehicle is covered with the under cover to provide a continuous flat and smooth surface.

15. The vehicle underfloor structure according to claim 1, wherein the under cover includes a rounded projection provided in a front area of the vehicle to collect the traveling airflow entering from a front side of the vehicle into the center region in the vehicle width direction, and the drain member is provided on a back side of the rounded projection in the front-back direction of the vehicle.

* * * * *